United States Patent
Mori et al.

(10) Patent No.: US 11,150,075 B2
(45) Date of Patent: Oct. 19, 2021

(54) ANGLE DETECTION DEVICE AND ELECTRIC POWER STEERING CONTROL DEVICE

(71) Applicant: Mitsubishi Electric Corporation, Tokyo (JP)

(72) Inventors: Tatsuya Mori, Tokyo (JP); Isao Kezobo, Tokyo (JP); Munenori Yamamoto, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 448 days.

(21) Appl. No.: 16/086,115

(22) PCT Filed: Apr. 28, 2016

(86) PCT No.: PCT/JP2016/063360
§ 371 (c)(1),
(2) Date: Sep. 18, 2018

(87) PCT Pub. No.: WO2017/187601
PCT Pub. Date: Nov. 2, 2017

(65) Prior Publication Data
US 2020/0300601 A1     Sep. 24, 2020

(51) Int. Cl.
*G01B 7/30*     (2006.01)
(52) U.S. Cl.
CPC .................. *G01B 7/30* (2013.01)
(58) Field of Classification Search
None
See application file for complete search history.

(56) References Cited

U.S. PATENT DOCUMENTS

| | | | |
|---|---|---|---|
| 2008/0157705 A1 | 7/2008 | Sasaki et al. | |
| 2014/0191625 A1* | 7/2014 | Kitamoto | H02K 11/25 310/68 B |
| 2014/0316733 A1* | 10/2014 | Mori | G01D 5/2053 702/94 |

FOREIGN PATENT DOCUMENTS

| EP | 1 988 639 A1 | 11/2008 |
|---|---|---|
| JP | 6-123639 A | 5/1994 |

(Continued)

OTHER PUBLICATIONS

Communication dated Jun. 25, 2019, from the European Patent Office in counterpart application No. 16900471.0.

(Continued)

*Primary Examiner* — Jermele M Hollington
*Assistant Examiner* — Suresh K Rajaputra
(74) *Attorney, Agent, or Firm* — Sughrue Mion, PLLC; Richard C. Turner

(57) ABSTRACT

An angle detection device including: an angle sensor AGSE outputting first and second sine wave signals SINWS1, SINWS2 having phases that are different from each other by 90 degrees in accordance with rotation of a detection target; an angle calculator calculating an angle signal corresponding to a rotation angle of the detection target based on SINWS1 and SINWS2; and an angle sensor AGSE abnormality determiner ASAD determining an abnormality of AGSE based on SINWS1 and SINWS2. The ASAD includes: an amplitude signal calculator calculating an amplitude signal MALS based on a square root of a sum of squares of SINWS1 and SINWS2; a first angle signal ANGS1 calculation processor calculating ANGS1 based on SINWS1 and MALS; a second angle signal ANGS2 calculation processor calculating ANGS2 based on SINWS2 and MALS; and an abnormality determination processor deter- (Continued)

mining the abnormality of AGSE based on an error between ANGS1 and ANGS2.

19 Claims, 20 Drawing Sheets

(56) References Cited

FOREIGN PATENT DOCUMENTS

| | | |
|---|---|---|
| JP | 2004-004028 A | 1/2004 |
| JP | 2005-351848 A | 12/2005 |
| JP | 2006-047228 A | 2/2006 |
| JP | 2008-180698 A | 8/2008 |
| JP | 2012-083279 A | 4/2012 |
| WO | 2007/097084 A1 | 8/2007 |
| WO | 2015/166528 A1 | 11/2015 |

OTHER PUBLICATIONS

International Search Report for PCT/JP2016/063360 dated Aug. 2, 2016 [PCT/ISA/210].

\* cited by examiner

FIG. 5

| SIGN OF S1(θ) | SIGN OF S2(θ) | θ1' |
|---|---|---|
| + | + | θ1 |
| + | − | −θ1+180 |
| − | − | θ1+180 |
| − | + | −θ1 |

FIG. 9

| SIGN OF S1(θ) | SIGN OF S2(θ) | θ2' |
|---|---|---|
| + | + | θ2 |
| + | − | 180−θ2 |
| − | − | θ2−180 |
| − | + | −θ2 |

ANGLE DETECTION DEVICE AND ELECTRIC POWER STEERING CONTROL DEVICE

CROSS REFERENCE TO RELATED APPLICATIONS

This application is a National Stage of International Application No. PCT/JP2016/063360, filed on Apr. 28, 2016.

TECHNICAL FIELD

The present invention relates to an angle detection device and an electric power steering control device.

BACKGROUND ART

In Patent Literature 1, the following electric power steering device is described. In the electric power steering device, a stub shaft and a pinion provided in a casing are coupled with use of a torsion bar, and the electric power steering device is configured to electrically detect a steering torque from a relative rotation angle between the stub shaft and the pinion to control output of an electric motor in accordance with the detected steering torque. Inside the casing, a resolver configured to detect the relative rotation angle between the stub shaft and the pinion is provided. Failure detection means is connected to the resolver. The failure detection means calculates a vector $A=\sin^2\theta+\cos^2\theta$ based on a sine signal and a cosine signal detected by the resolver. The failure detection means monitors whether this vector A is within a normal range set in advance, and determines that the resolver is out of order when the vector A is outside of the normal range.

CITATION LIST

Patent Literature

[PTL 1] JP 2005-351848 A, claim 1

SUMMARY OF INVENTION

Technical Problem

Amplitudes of the sine signal and the cosine signal described above vary depending on the temperature of an angle sensor, for example, the resolver, and a detection circuit therefor. Therefore, even when the resolver is not out of order, the vector A may be deviated from the normal range due to the temperature variation, and the resolver may be erroneously determined as being out of order.

The present invention has been made to solve the above-mentioned problem, and has an object to provide an angle detection device and an electric power steering control device, which are capable of properly detecting failure even when amplitudes of detected sine wave signals vary due to temperature change or other causes.

Solution to Problem

According to one embodiment of the present invention, there is provided, for example, an angle detection device including: an angle sensor configured to output a first sine wave signal and a second sine wave signal having phases that are different from each other by 90 degrees in accordance with rotation of a detection target; an angle calculator configured to calculate an angle signal corresponding to a rotation angle of the detection target based on the first sine wave signal and the second sine wave signal; and an angle sensor abnormality determiner configured to determine an abnormality of the angle sensor based on the first sine wave signal and the second sine wave signal, the angle sensor abnormality determiner including: an amplitude signal calculator configured to calculate an amplitude signal based on a square root of a sum of squares, which is a value obtained by squaring and then adding the first sine wave signal and the second sine wave signal; a first angle signal calculation processor configured to calculate a first angle signal based on the first sine wave signal and the amplitude signal; a second angle signal calculation processor configured to calculate a second angle signal based on the second sine wave signal and the amplitude signal; and an abnormality determination processor configured to determine the abnormality of the angle sensor based on an error between the first angle signal and the second angle signal.

Advantageous Effects of Invention

According to one embodiment of the present invention, it is possible to provide the angle detection device and the electric power steering control device, which are capable of properly detecting failure even when the amplitudes of the detected first and second sine wave signals vary due to temperature change or other causes.

BRIEF DESCRIPTION OF DRAWINGS

FIG. 5 is a table for showing values of a first corrected angle signal $\theta1'$ obtained after correction in accordance with a sign of the first sine wave signal $S1(\theta)$ and a sign of the second sine wave signal $S2(\theta)$ in the first embodiment of the present invention.

FIG. 9 is a table for showing values of a second corrected angle signal $\theta2'$ obtained after correction in accordance with the sign of the first sine wave signal $S1(\theta)$ and the sign of the second sine wave signal $S2(\theta)$ in the second embodiment of the present invention.

DESCRIPTION OF EMBODIMENTS

In an angle detection device according to the present invention, regarding a detected first sine wave signal and a detected second sine wave signal having phases that are different from each other by 90 degrees, an amplitude signal that is a square root of a sum of squares of the first sine wave and the second sine wave signal is obtained, a first angle signal is obtained based on the first sine wave signal and the amplitude signal, and a second angle signal is obtained based on the second sine wave signal and the amplitude signal, so that failure is determined in accordance with a result of comparison between respective angle signals obtained from respective sine wave signals. With this configuration, even when amplitudes of the first sine wave signal and the second sine wave signal vary, the failure can be properly detected.

Now, an angle detection device and an electric power steering control device according to the present invention is described with reference to the drawings by way of embodiments. In the embodiments, like or corresponding parts are denoted by like symbols, and redundant description is omitted.

First Embodiment

Figure 1:
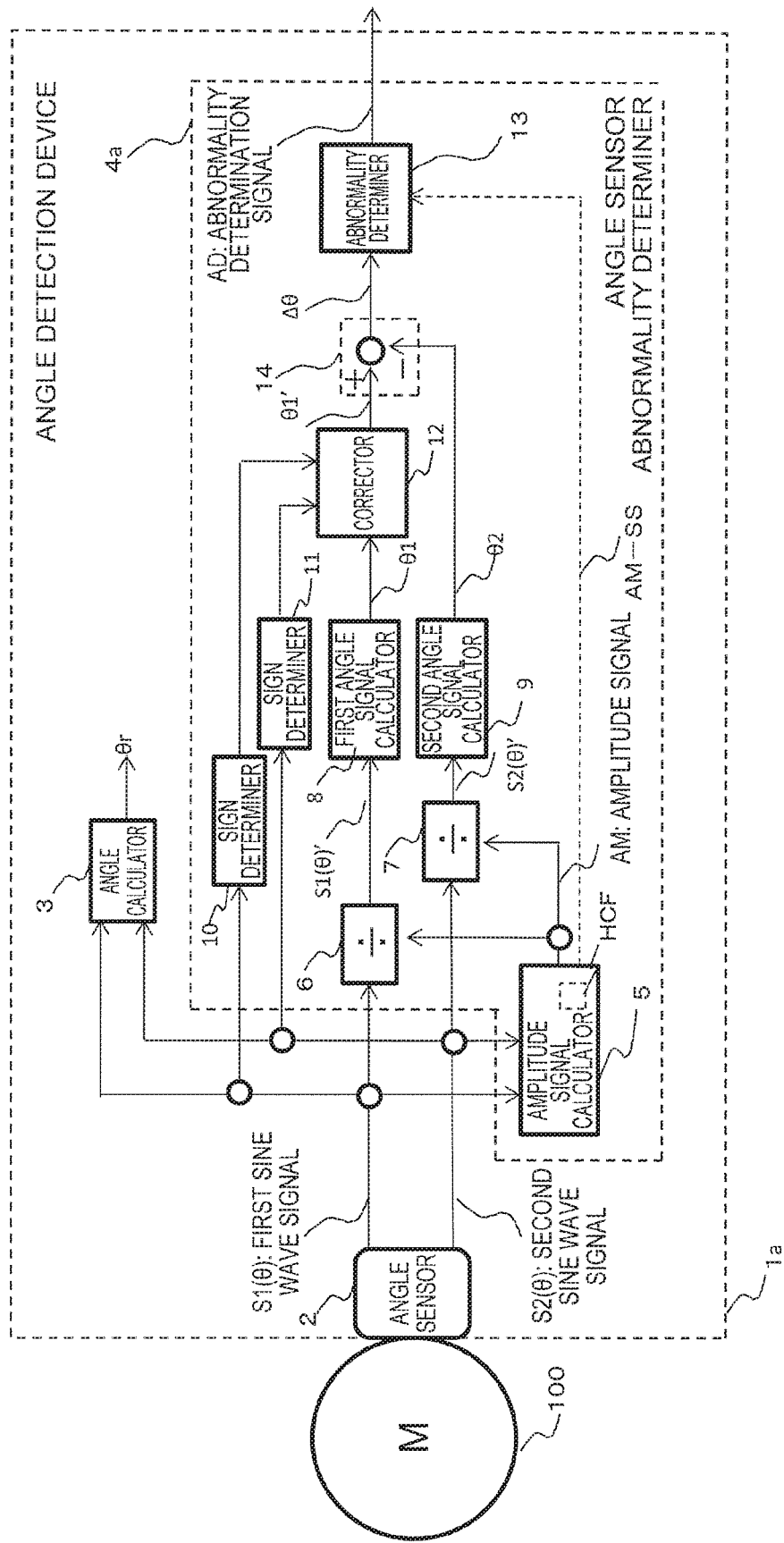
FIG. 1 is a diagram for illustrating an example of an overall configuration of an angle detection device according to a first embodiment of the present invention.

FIG. 1 is a diagram for illustrating an example of an overall configuration of an angle detection device according to a first embodiment of the present invention.

A detection target 100 is a rotating machine. The detection target 100 is not limited to a rotating machine, and may be any rotary member configured to rotate about one axis, for example, a steering or a tire in an automobile, a wheel in a railway vehicle, or a water wheel.

Subsequently, an angle detection device 1a is described. The angle detection device 1a includes an angle sensor 2, an angle calculator 3, and an angle sensor abnormality determiner 4a. Each component is described below.

Figure 2:
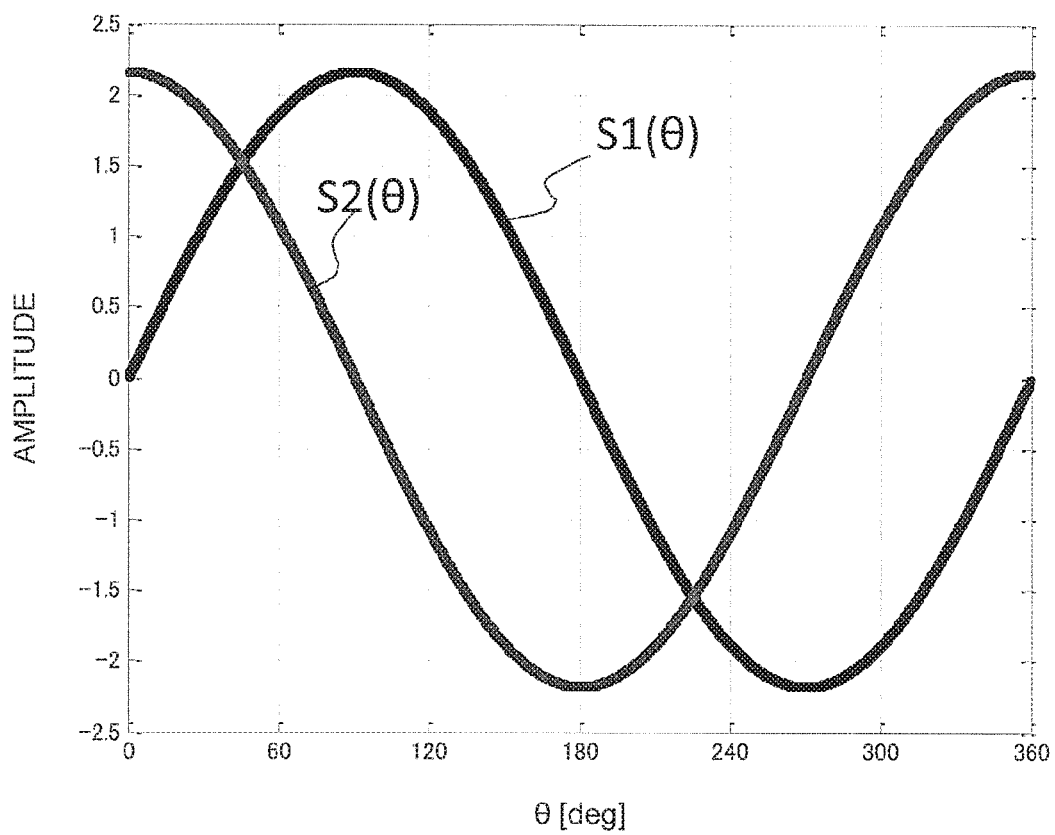
FIG. 2 is a waveform chart of a first sine wave signal $S1(\theta)$ and a second sine wave signal $S2(\theta)$ with respect to one period of a rotation angle in the first embodiment of the present invention.

The angle sensor 2 formed of, for example, a magnetic resistance (MR) sensor, outputs a first sine wave signal $S1(\theta)$ and a second sine wave signal $S2(\theta)$ having phases that are shifted from each other by 90 degrees in accordance with a detection target rotation angle $\theta$ of the detection target 100. FIG. 2 is a waveform chart of the first sine wave signal $S1(\theta)$ and the second sine wave signal $S2(\theta)$ with respect to one period of a rotation angle, Amplitudes of both the signals are substantially the same. The angle sensor 2 is only required to be a sensor configured to output two sine wave signals having phases different from each other, and may be, for example, a resolver.

The angle calculator 3 calculates an angle signal θr based on the first sine wave signal $S1(\theta)$ and the second sine wave signal $S2(\theta)$ by subjecting a value obtained by dividing the first sine wave signal $S1(\theta)$ by the second sine wave signal $S2(\theta)$ to inverse tangent calculation.

The angle sensor abnormality determiner 4a outputs an abnormality determination signal AD for determining that the angle sensor 2 is abnormal based on the first sine wave signal $S1(\theta)$ and the second sine wave signal $S2(\theta)$. Now, the angle sensor abnormality determiner 4a is described.

An amplitude signal calculator 5 calculates a sum of squares from a sum of a value obtained by squaring the first sine wave signal $S1(\theta)$ and a value obtained by squaring the second sine wave signal $S2(\theta)$, and calculates a square root of the sum of squares, to thereby calculate an amplitude signal AM.

A divider 6 divides the first sine wave signal $S1(\theta)$ by the amplitude signal AM to output a first divided sine wave signal $S1(\theta)'$.

A divider 7 divides the second sine wave signal $S2(\theta)$ by the amplitude signal AM to output a second divided sine wave signal $S2(\theta)'$.

In this case, the sine wave signal output from the angle sensor 2 is subjected to division, but when a center value is offset, needless to say, a sine wave signal obtained by subtracting the amount of offset is used.

Figure 3A:
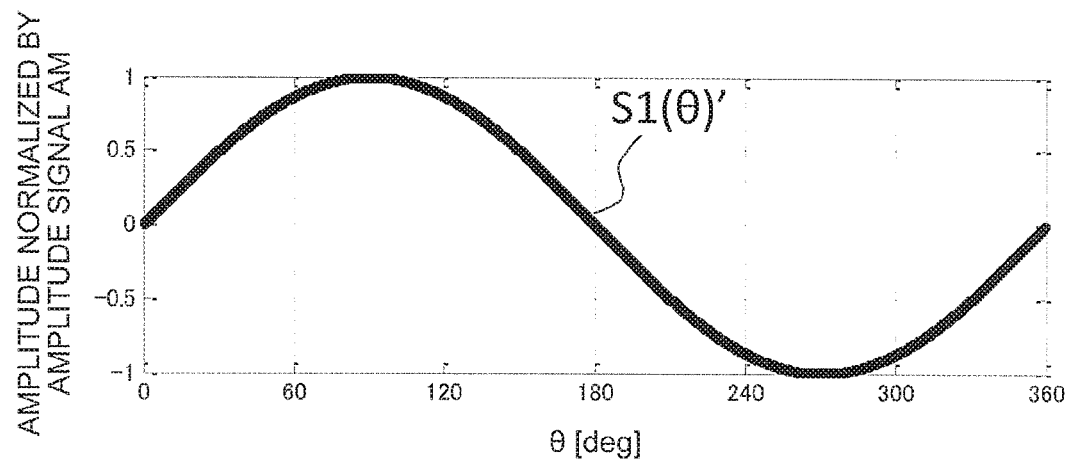
FIG. 3A and FIG. 3B are waveform charts for illustrating a first divided sine wave signal $S1(\theta)'$ and a first angle signal $\theta1$ in the first embodiment of the present invention.
Figure 3B:
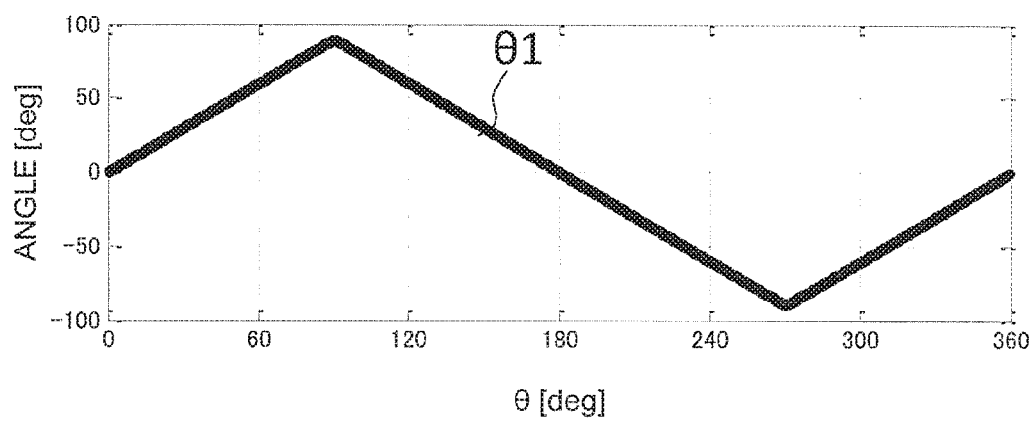

A first angle signal calculator 8 subjects the first divided sine wave signal $S1(\theta)'$ output from the divider 6 to inverse sine calculation to calculate a first angle signal θ1. FIG. 3A is a waveform chart of the first divided sine wave signal $S1(\theta)'$, and FIG. 3B is a waveform chart of the first angle signal θ1. The horizontal axis represents a detection target rotation angle θ, and the value of the first angle signal θ1 ranges from −90 degrees to 90 degrees as indicated by the vertical axis of FIG. 3B.

Figure 4A:
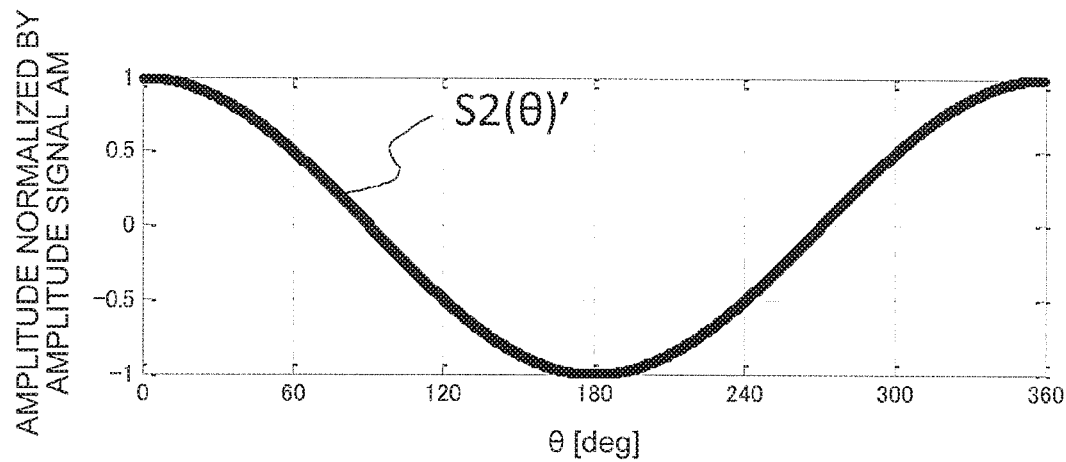
FIG. 4A and FIG. 4B are waveform charts for illustrating a second divided sine wave signal $S2(\theta)'$ and a second angle signal $\theta2$ in the first embodiment of the present invention.
Figure 4B:
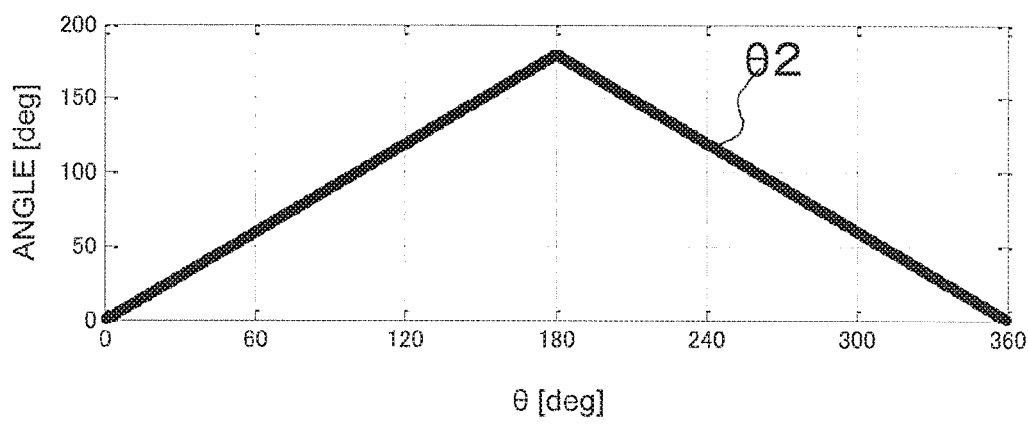

A second angle signal calculator 9 subjects the second divided sine wave signal $S2(\theta)'$ output from the divider 7 to inverse cosine calculation to calculate a second angle signal $\theta2$. FIG. 4A is a waveform chart of the second divided sine wave signal $S2(\theta)'$, and FIG. 4B is a waveform chart of the second angle signal $\theta2$. The horizontal axis represents a detection target rotation angle $\theta$, and the value of the second angle signal $\theta2$ ranges from 0 degrees to 180 degrees as indicated by the vertical axis of FIG. 4B.

A sign determiner 10 determines the sign of the first sine wave signal $S1(\theta)$. The sign is positive when $S1(\theta)$ is equal to or larger than 0, and the sign is negative when $S1(\theta)$ is smaller than 0.

A sign determiner 11 determines the sign of the second sine wave signal $S2(\theta)$. The sign is positive when $S2(\theta)$ is equal to or larger than 0, and the sign is negative when $S2(\theta)$ is smaller than 0.

A corrector 12 corrects and outputs the first angle signal $\theta1$ as a first corrected angle signal $\theta1'$ in accordance with the sign of the first sine wave signal $S1(\theta)$ output by the sign determiner 10 and the sign of the second sine wave signal $S2(\theta)$ output by the sign determiner 11.

Figure 5:
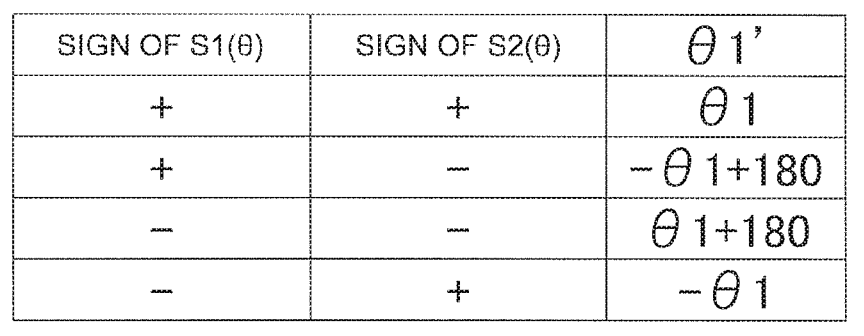
Figure 6A:
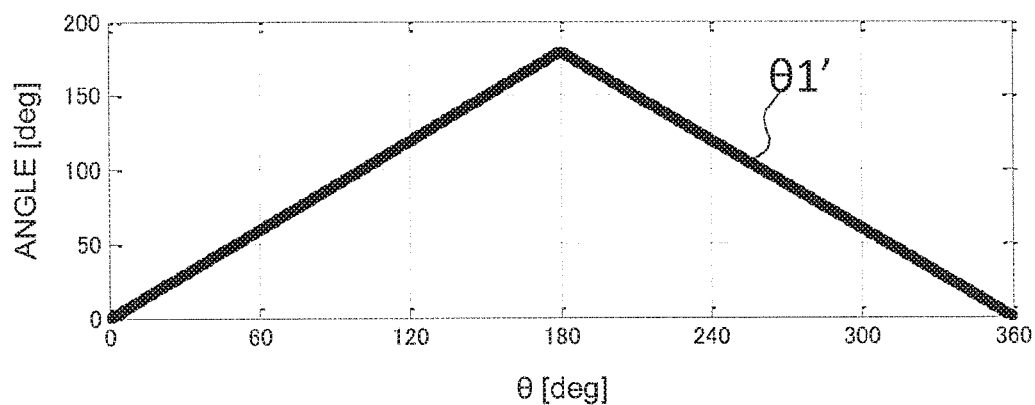
FIG. 6A and FIG. 6B are waveform charts for illustrating the first corrected angle signal $\theta1$ obtained after the correction and the second angle signal $\theta2$ in the first embodiment of the present invention.
Figure 6B:
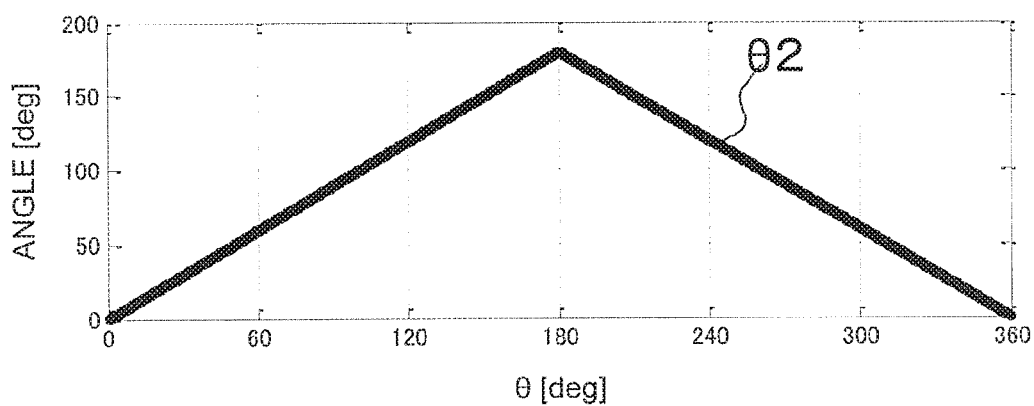

FIG. 5 is a table for showing values of the first corrected angle signal $\theta1'$ obtained after the correction in accordance with the sign of the first sine wave signal $S1(\theta)$ and the sign of the second sine wave signal $S2(\theta)$. Through correction as shown in FIG. 5, the values that have ranged from −90 degrees to 90 degrees before the correction are corrected to range from 0 degrees to 180 degrees similarly to the second angle signal $\theta2$. FIG. 6A is a waveform chart of the first corrected angle signal $\theta1$ obtained after the correction, and FIG. 6B is a waveform chart of the second angle signal $\theta2$. The rotation angle has one period of 360 degrees, and hence, needless to say, a case in which correction is performed with use of values obtained by adding 360×n (n is a positive integer) to the value of FIG. 5 is also included in the present invention.

A subtractor 14 calculates a difference between the first corrected angle signal $\theta1'$ corrected by the corrector 12 and the second angle signal $\theta2$ from the second angle signal calculator 9 to calculate an angle error $\Delta\theta$.

An abnormality determiner 13 determines based on an absolute value of the angle error $\Delta\theta$ that the angle sensor 2 is abnormal when the absolute value is such a numerical value that the angle error cannot take at the time of a normal state, that is, when the absolute value of the angle error $\Delta\theta$ is equal to or larger than a set threshold value. Then, the abnormality determiner 13 outputs the abnormality determination signal AD indicating abnormality.

The angle detection device according to the present invention has a configuration in which the first angle signal $\theta1$ is calculated based on the first sine wave signal $S1(\theta)$ and the second angle signal $\theta2$ is calculated based on the second sine wave signal $S2(\theta)$.

In this manner, the first angle signal $\theta1$ is abnormal when abnormality occurs in the first sine wave signal $S1(\theta)$, and the angle error $\Delta\theta$ between the first angle signal $\theta1$ and the second angle signal $\theta2$ is increased. Thus, the abnormality of the angle sensor 2 can be detected.

Similarly, the second angle signal $\theta2$ is abnormal when abnormality occurs in the second sine wave signal $S2(\theta)$, and the angle error $\Delta\theta$ between the second angle signal $\theta2$ and the first angle signal is increased. Thus, the abnormality of the angle sensor 2 can be detected.

Now, effects of the first embodiment over the related art are described.

Figure 7A:
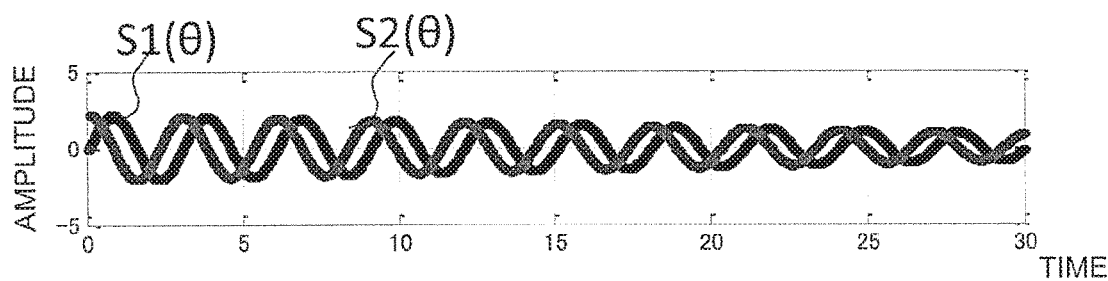
FIG. 7A to FIG. 7E are time charts of signals from respective components of the angle detection device according to the first embodiment of the present invention.
Figure 7B:
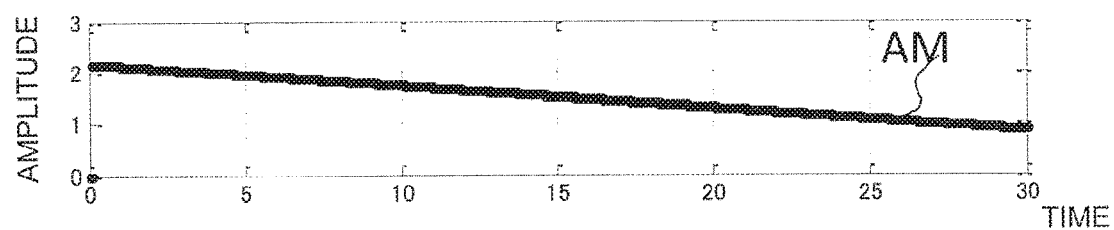
Figure 7C:
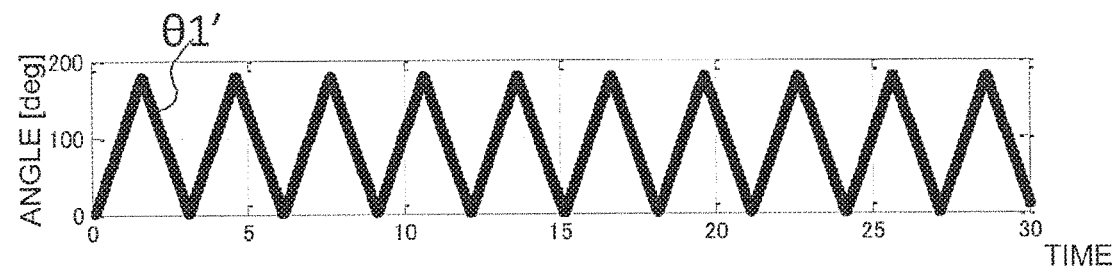
Figure 7D:
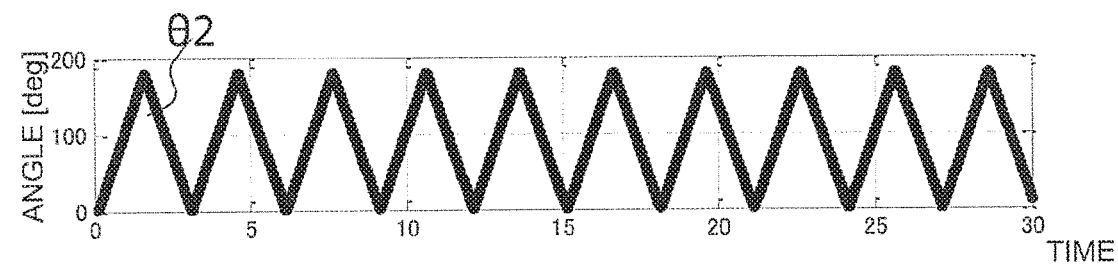

FIG. 7A to FIG. 7E are time charts of signals from respective components of the angle detection device according to the first embodiment of the present invention, in which:

FIG. 7A represents the first sine wave signal $S1(\theta)$ and the second sine wave signal $S2(\theta)$;

FIG. 7B represents the amplitude signal AM;

FIG. 7C represents the first corrected angle signal $\theta1'$;

FIG. 7D represents the second angle signal $\theta2$; and

Figure 7E:
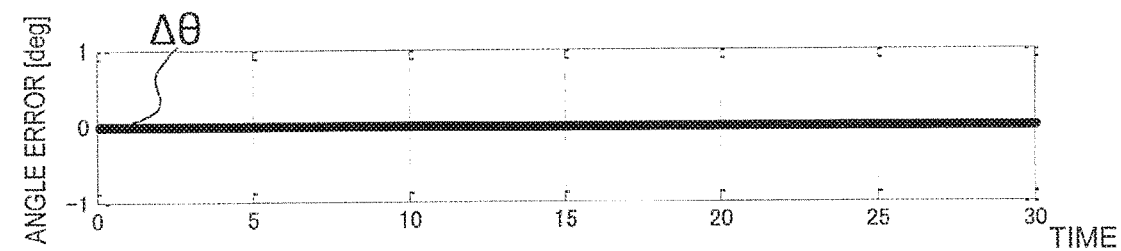

FIG. 7E represents the angle error $\Delta\theta$. The horizontal axis represents time. As illustrated in FIG. 7A to FIG. 7E, even when the amplitudes of the first sine wave signal $S1(\theta)$ and the second sine wave signal $S2(\theta)$ vary so that the amplitudes are reduced as the time elapses due to temperature variation of the angle sensor 2 or the like, the angle error $\Delta\theta$ is maintained to substantially 0, and thus erroneous detection of the failure does not occur.

However, in Patent Literature 1 described above, the vector $A = \sin^2\theta + \cos^2\theta$ is calculated, and whether the vector A falls within the normal range set in advance is monitored. When the vector A is outside of the normal range, it is determined that the resolver is out of order. Therefore, when the amplitude signal AM varies due to the temperature variation of the angle sensor 2 as illustrated in FIG. 7B, the failure is erroneously detected.

In view of the above, with the configuration of the first embodiment of the present invention, the following remarkable effect that is not obtained in the related art is provided. That is, even when the amplitude signal AM varies due to the temperature variation of the angle sensor 2 or the like, the failure of the angle sensor 2 is not erroneously detected.

In the first embodiment, the corrector 12 is used to correct the first angle signal $\theta1$ to the first corrected angle signal $\theta1'$, but with reference to FIGS. 3A, 3B and FIGS. 4A, 4B, the first angle signal $\theta1$ and the second angle signal $\theta2$ match each other when the detection target rotation angle $\theta$ is equal to or larger than 0 degrees and smaller than 90 degrees. Therefore, when the failure of the angle sensor 2 is detected only in this range, $\theta1$ matches $\theta2$, and hence the corrector 12 is unnecessary. That is, needless to say, the corrector 12 is not a necessary configuration in the first embodiment of the present invention.

Second Embodiment

Figure 8:
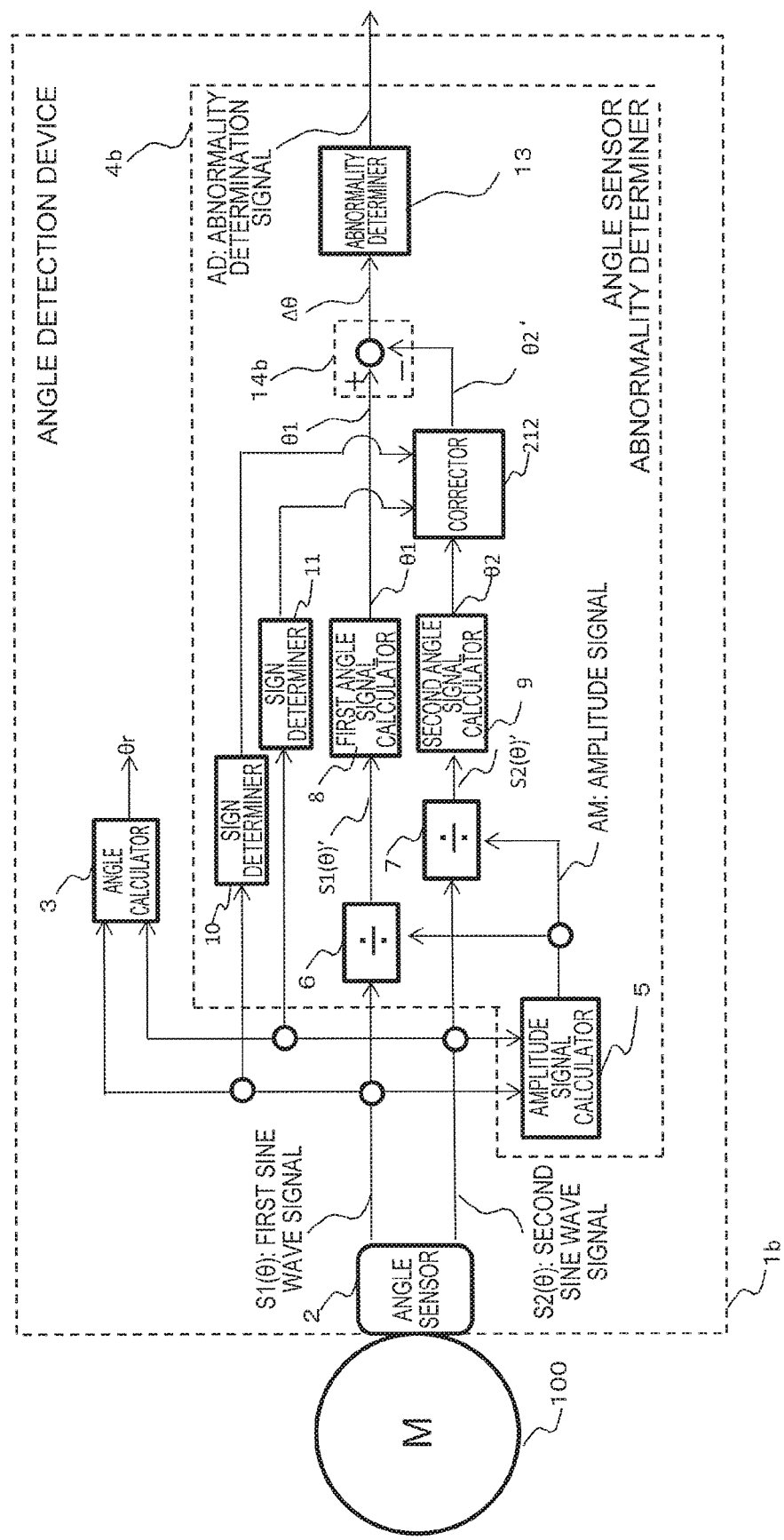
FIG. 8 is a diagram for illustrating an example of an overall configuration of an angle detection device according to a second embodiment of the present invention.

FIG. 8 is a diagram for illustrating an example of an overall configuration of an angle detection device according to a second embodiment of the present invention.

The second embodiment differs from the first embodiment in a corrector 212 and a subtractor 14b included in an angle sensor abnormality determiner 4b in an angle detection device 1b illustrated in FIG. 8. In the second embodiment, the first angle signal $\theta1$ is not corrected, and the value calculated by the first angle signal calculator 8 is directly input to the subtractor 14b.

Meanwhile, the second angle signal $\theta2$ is corrected by the corrector 212, and a second corrected angle signal $\theta2'$ obtained after the correction is input to the subtractor 14b.

Figure 9:
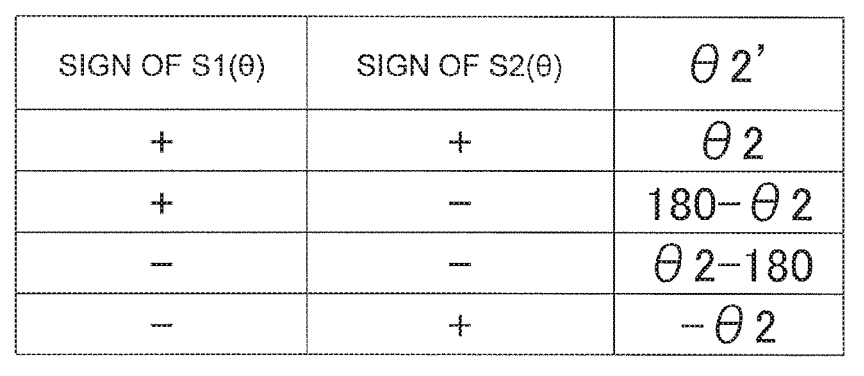

FIG. 9 is a table for showing values of the second corrected angle signal $\theta2'$ obtained after the correction in accordance with the sign of the first sine wave signal $S1(\theta)$ and the sign of the second sine wave signal $S2(\theta)$. Through correction as shown in FIG. 9, the values that have ranged from 0 degrees to 180 degrees before the correction are corrected to range from −90 degrees to 90 degrees similarly to the first angle signal $\theta1$. The rotation angle has one period of 360 degrees, and hence, needless to say, a case in which correction is performed with use of values obtained by adding 360×n (n is a positive integer) to the value of FIG. 9 is also included in the present invention.

Figure 10A:
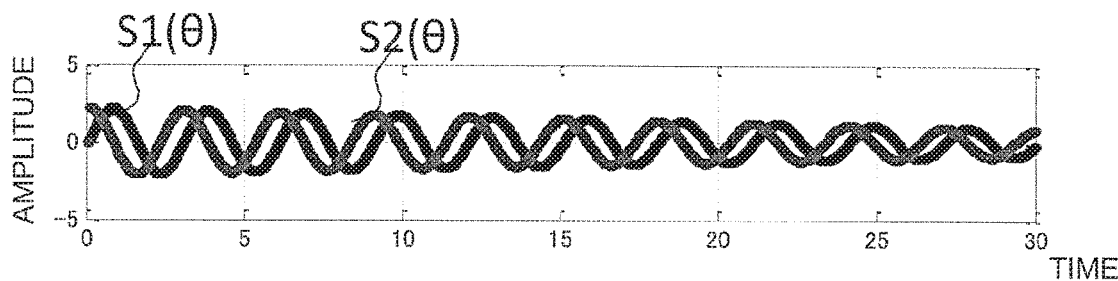
FIG. 10A to FIG. 10E are time charts of signals from respective components of the angle detection device according to the second embodiment of the present invention.
Figure 10B:
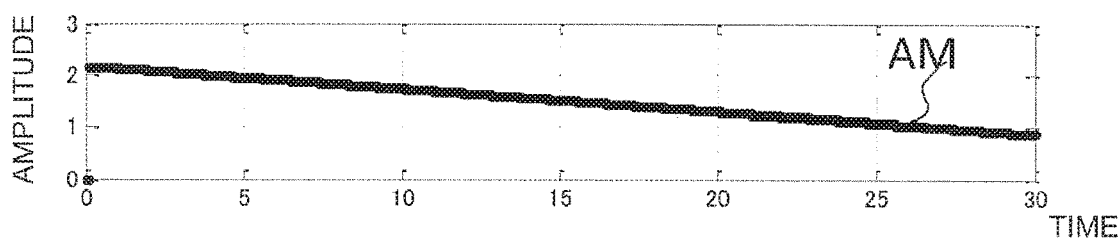
Figure 10C:
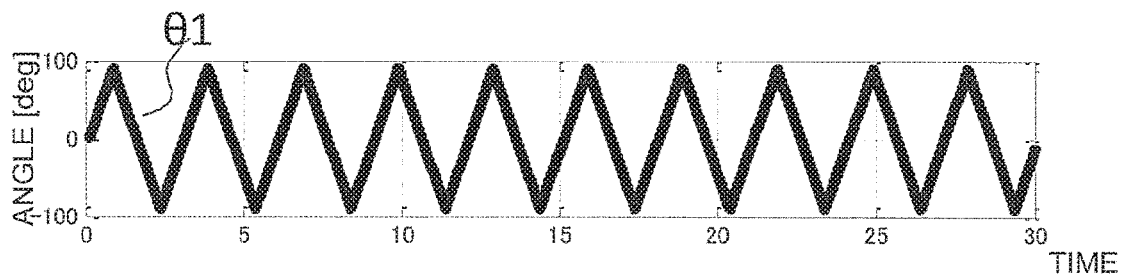
Figure 10D:
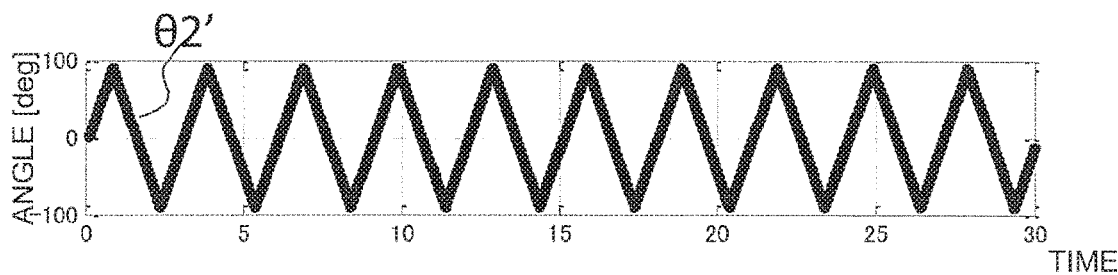

FIG. 10A to FIG. 10E are time charts of signals from respective components of the angle detection device according to the second embodiment of the present invention, in which:

FIG. 10A represents the first sine wave signal S1(θ) and the second sine wave signal S2(θ);

FIG. 10B represents the amplitude signal AM;

FIG. 10C represents the first angle signal θ1;

FIG. 10D represents the second corrected angle signal θ2'; and

Figure 10E:
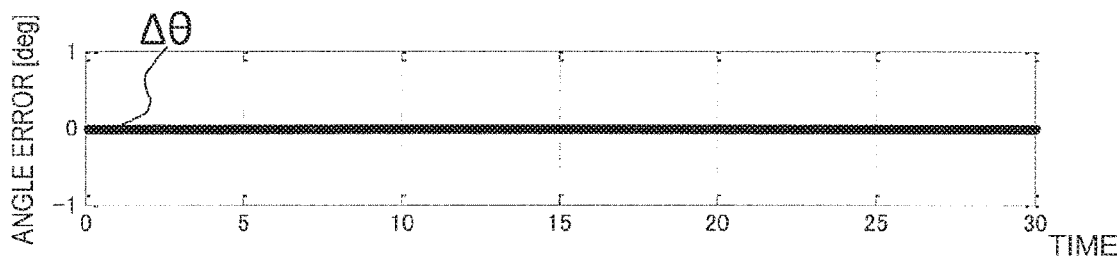
Figure 11A:
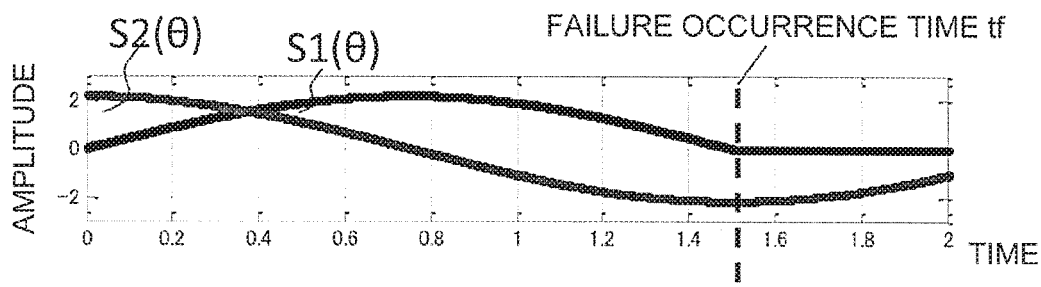
FIG. 11A to FIG. 11E are time charts of signals from respective components for illustrating an operation at the time when failure occurs in an angle detection device according to a third embodiment of the present invention.
Figure 11B:
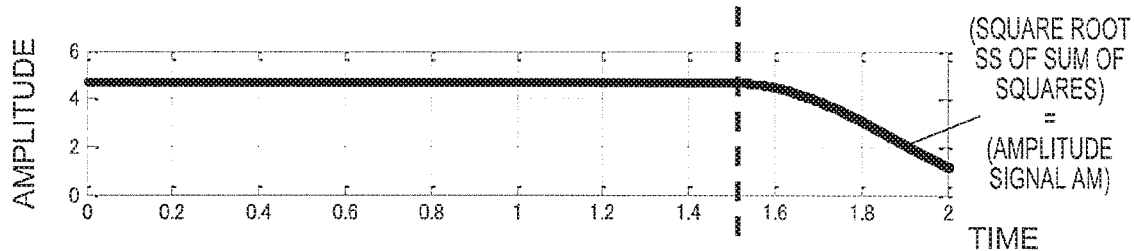
Figure 11C:
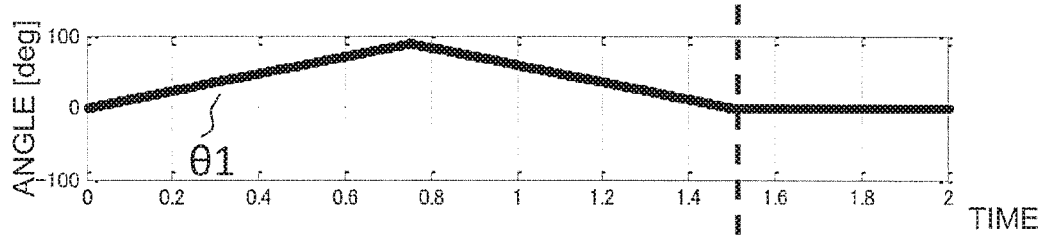
Figure 11D:
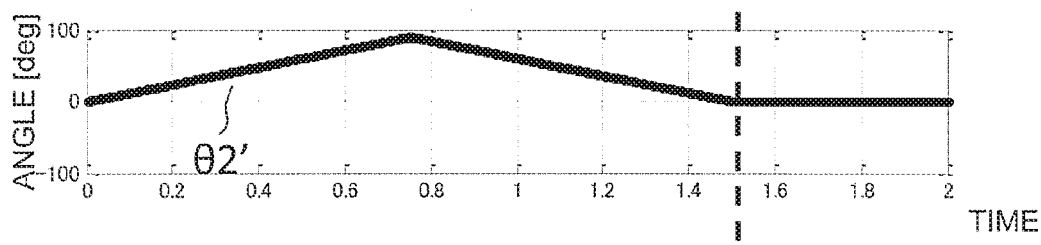
Figure 11E:
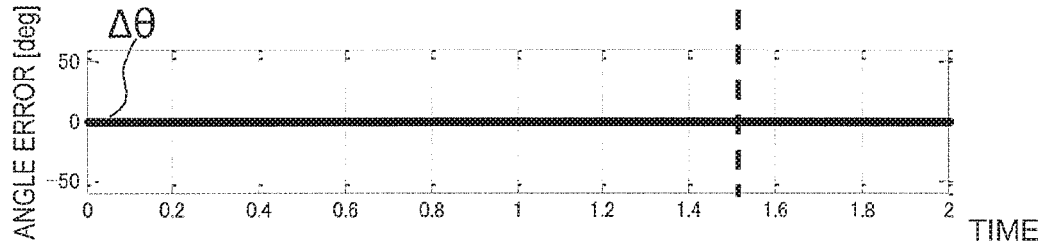

FIG. 10E represents the angle error Δθ. The horizontal axis represents time. As illustrated in FIGS. 10A to 10E, similarly to FIGS. 7A to 7E, even when the amplitudes of the first sine wave signal S1(θ) and the second sine wave signal S2(θ) vary due to temperature variation of the angle sensor 2 or the like, the angle error Δθ is maintained to substantially 0, and thus erroneous detection of the failure does not occur.

In view of the above, according to the second embodiment, the same effect as that in the first embodiment can be obtained even when the second angle signal θ2 is corrected so as to have the value range that matches the value range of the first angle signal θ1.

In the second embodiment, the corrector 212 is used to correct the second angle signal θ2 to the second corrected angle signal θ2', but with reference to FIGS. 3A, 3B and FIGS. 4A, 4B, the first angle signal θ1 and the second angle signal θ2 match each other when the detection target rotation angle θ is equal to or larger than 0 degrees and smaller than 90 degrees. Therefore, when the failure of the angle sensor 2 is detected only in this range, θ1 matches θ2, and hence the corrector 212 is unnecessary. That is, needless to say, the corrector 212 is not a necessary configuration in the second embodiment of the present invention.

Third Embodiment

FIGS. 11A to 11E are time charts of signals from respective components of the angle detection device corresponding to FIGS. 10A to 10E in a case in which, in the configuration of the second embodiment, the first sine wave signal S1(θ) is fixed to 0 irrespective of the detection target rotation angle θ at a failure occurrence time tf. After the failure occurrence time tf, there may occur such a trouble that both of the first angle signal θ1 and the second corrected angle signal θ2' are fixed to 0 degrees. This trouble is caused by the amplitude signal AM that is reduced as the second sine wave signal S2(θ) is reduced.

Figure 12:
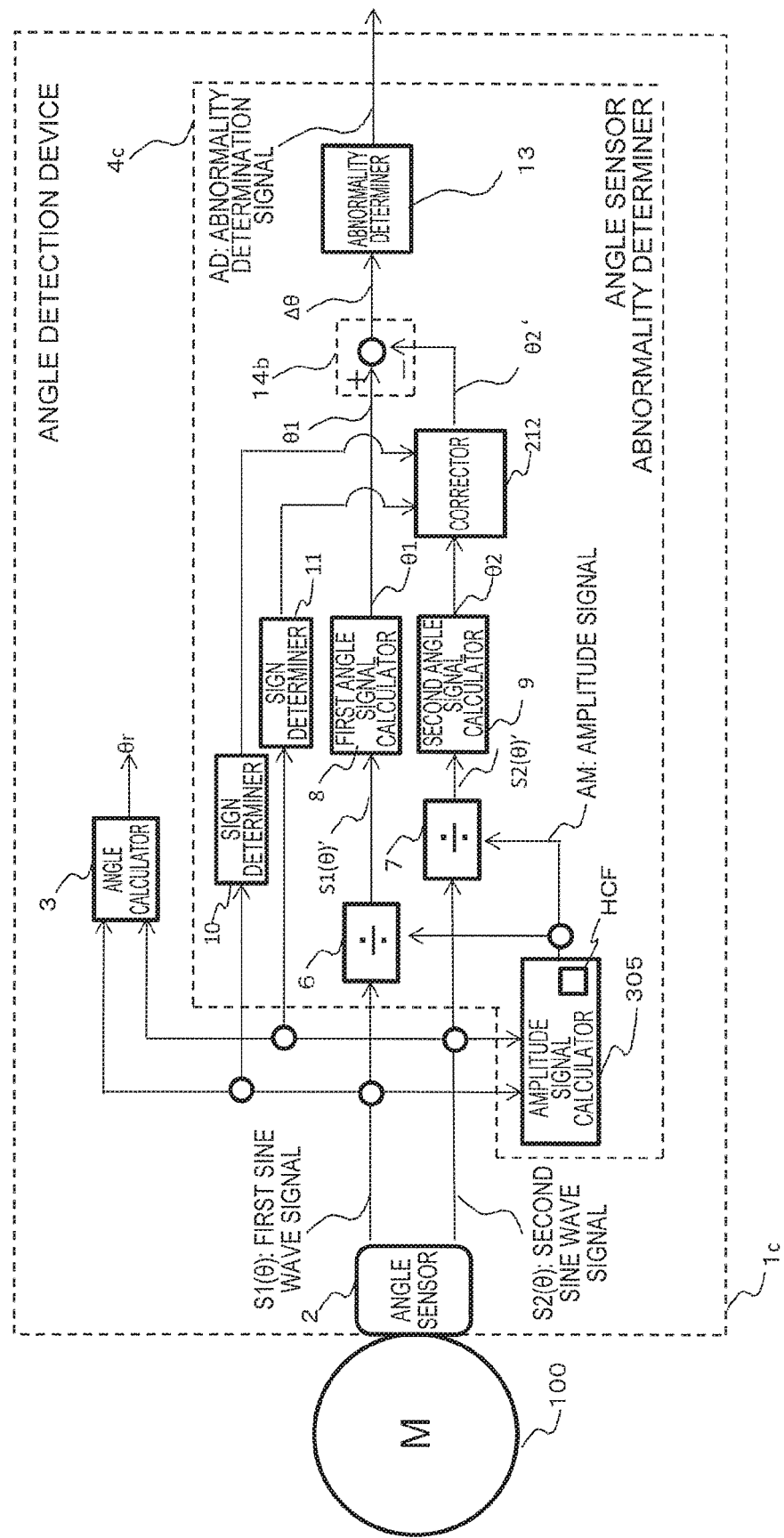
FIG. 12 is a diagram for illustrating an example of an overall configuration of the angle detection device according to the third embodiment of the present invention.
Figure 13A:
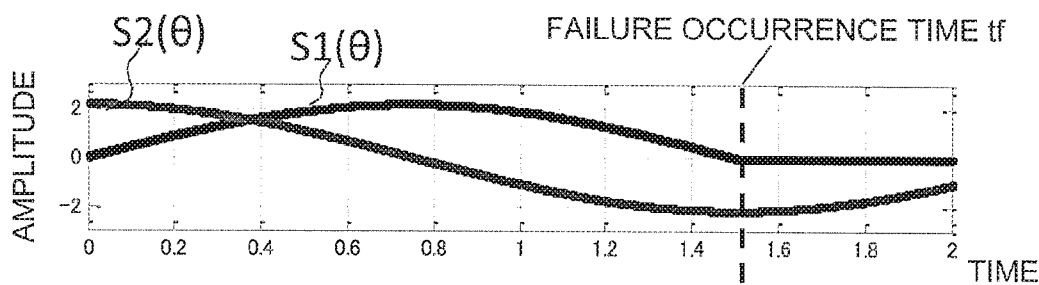
FIG. 13A to FIG. 13E are time charts of signals from respective components at the time when failure occurs in the angle detection device according to the third embodiment of the present invention.
Figure 13B:
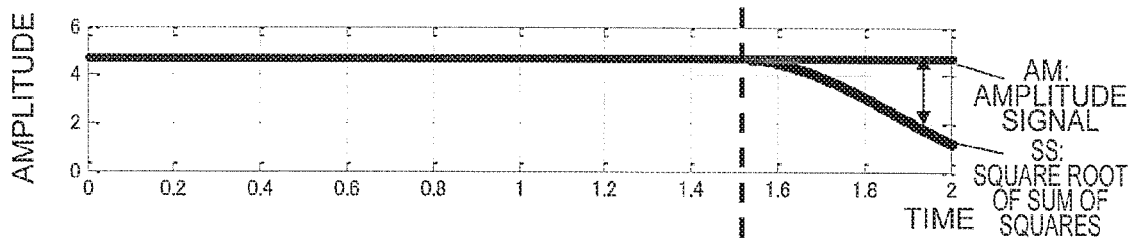
Figure 13C:
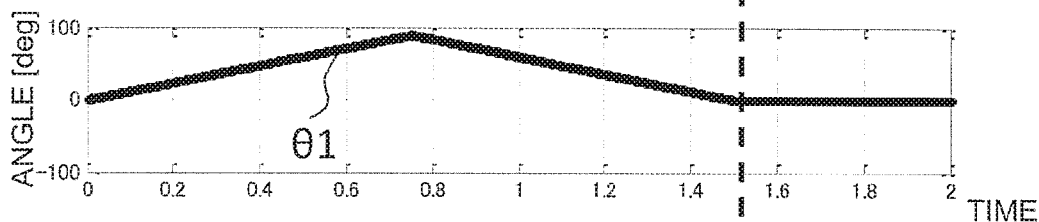
Figure 13D:
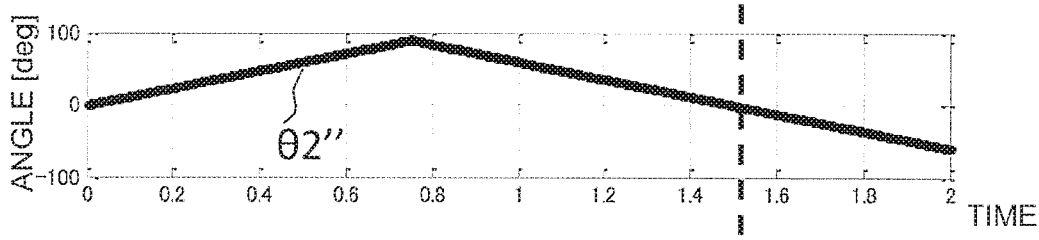
Figure 13E:
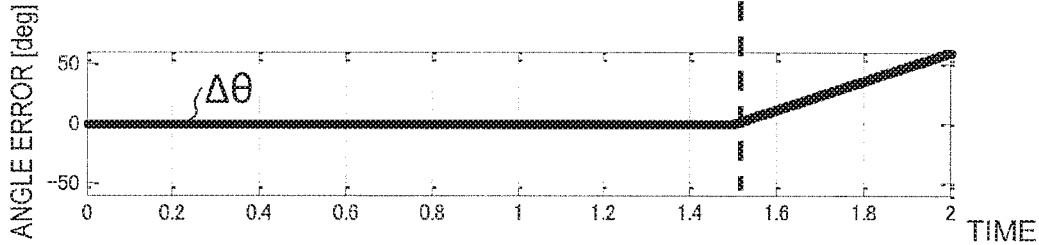

FIG. 12 is a diagram for illustrating an example of an overall configuration of an angle detection device according to a third embodiment of the present invention. FIGS. 13A to 13E are time charts of signals from respective components at the time when failure occurs in the angle detection device according to the third embodiment of the present invention. In view of the above-mentioned situation, in the third embodiment, an amplitude signal calculator 305 of an angle sensor abnormality determiner 4c in an angle detection device 1c illustrated in FIG. 12 causes a square root of a sum of squares, which is obtained from the first sine wave signal S1(θ) and the second sine wave signal S2(θ), to pass through a high cut filter HCF having a cutoff frequency that is set in advance to be higher than a variable frequency of the amplitude of the first sine wave signal S1(θ) or the second sine wave signal S2(θ) due to heat generation, to thereby set a value subjected to filtering as the amplitude signal AM.

With use of such a high cut filter HCF having, for example, a cutoff frequency of 10 Hz or less, as illustrated in FIGS. 13A to 13E, a variation of a square root SS of a sum of squares caused by a short-term variation of an instantaneous value of the second sine wave signal S2(θ) is cut off, and the value obtained by causing the variation of the amplitude due to the heat generation to pass through the filter is set as the amplitude signal AM. In this manner, a second corrected angle signal θ2", which is based on the second sine wave signal S2(θ) in which no failure occurs, operates normally, and the angle error Δθ is caused between the second corrected angle signal θ2" and the first angle signal θ1, which is based on the first sine wave signal S1(θ) in which the failure occurs. Thus, the failure can be detected.

As described above, according to the configuration of the third embodiment, the failure of the angle sensor 2 can be detected even when such a failure that one of the first sine wave signal S1(θ) and the second sine wave signal S2(θ) is fixed to 0 occurs.

When the third embodiment is to be implemented in the first embodiment, the amplitude signal calculator 5 of FIG. 1 similarly includes the high cut filter HCF as indicated by the broken line.

Fourth Embodiment

Figure 14:
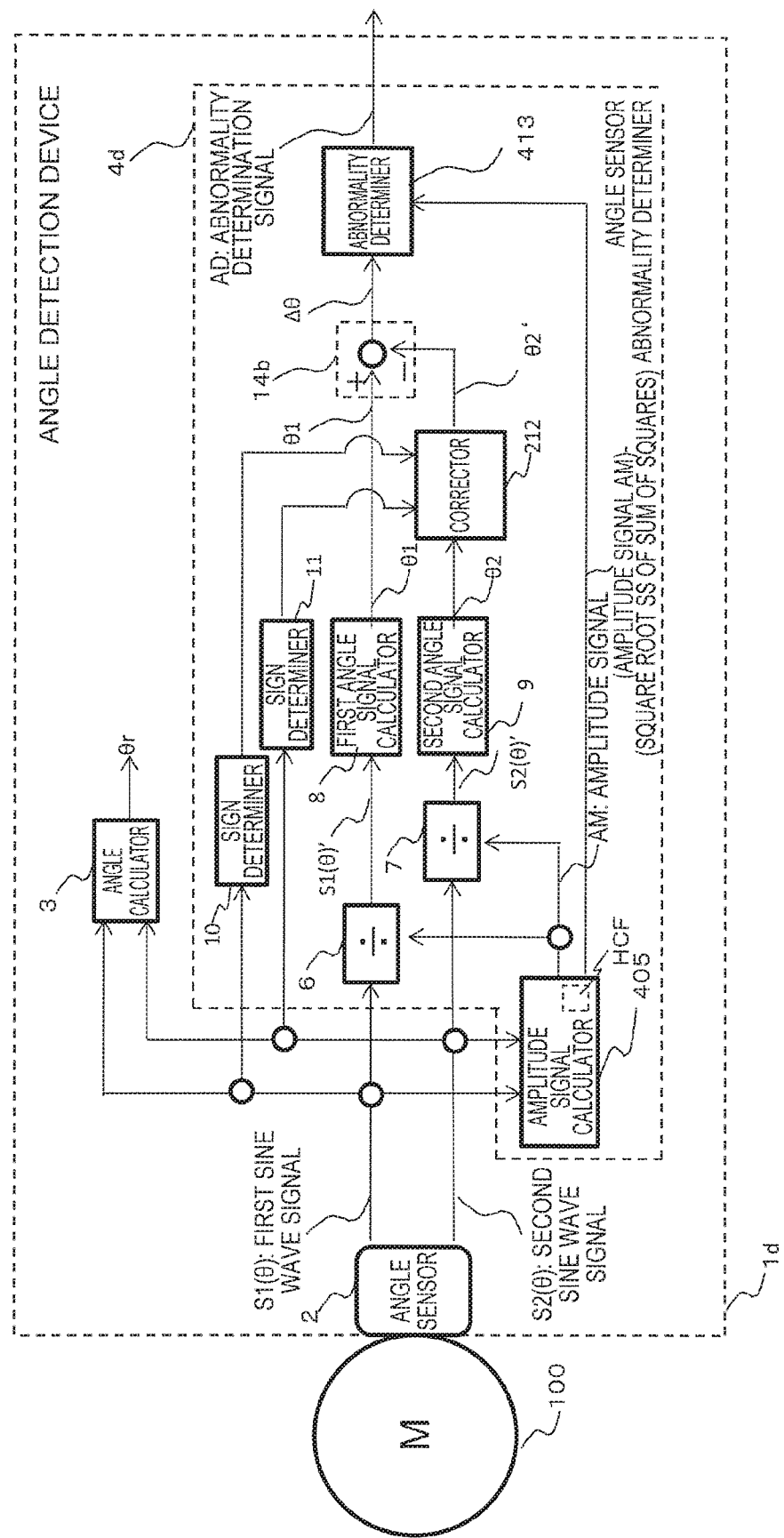
FIG. 14 is a diagram for illustrating an example of an overall configuration of an angle detection device according to a fourth embodiment of the present invention.

FIG. 14 is a diagram for illustrating an example of an overall configuration of an angle detection device according to a fourth embodiment of the present invention. The fourth embodiment differs from the third embodiment in an amplitude signal calculator 405 and an abnormality determiner 413 included in an angle sensor abnormality determiner 4d in an angle detection device 1d illustrated in FIG. 14.

The amplitude signal calculator 405 outputs a value obtained by subtracting the square root SS of the sum of the squares from the amplitude signal AM to the abnormality determiner 413. Other functions are the same as those of the amplitude signal calculator 305.

The abnormality determiner 413 has, in addition to the function of the abnormality determiner 13 in the above-mentioned embodiments, a function of outputting the abnormality determination signal AD based on the value obtained by subtracting the square root SS of the sum of the squares from the amplitude signal AM. This is because, after the failure occurrence time tf, at which the first sine wave signal S1(θ) is fixed to 0 in FIGS. 13A to 13E referred to in the third embodiment, the square root SS of the sum of the squares is deviated from the amplitude signal AM, and the failure of the angle sensor 2 can be detected even through the detection of the deviation.

In view of this, according to the fourth embodiment, the amplitude signal calculator 405 outputs a subtraction value AM-SS between the amplitude signal and the square root of the sum of the squares. The abnormality determiner 413 determines based on the subtraction value AM-SS that the angle sensor (2) is abnormal or out of order when a difference between the amplitude signal AM and the square root SS of the sum of the squares, that is, an absolute value of the subtraction value AM-SS is equal to or larger than a setting value set in advance. With this configuration for detecting the failure of the angle sensor 2, such an effect that the capability of detecting the failure of the angle sensor 2 is improved is provided.

When the fourth embodiment is to be implemented in the first embodiment, the amplitude signal calculator 5 of FIG. 1 similarly outputs the value obtained by subtracting the square root SS of the sum of the squares from the amplitude signal AM to the abnormality determiner 13, and the abnormality determiner 13 outputs the abnormality determination signal AD based on the value obtained through subtraction.

Fifth Embodiment

Figure 15:
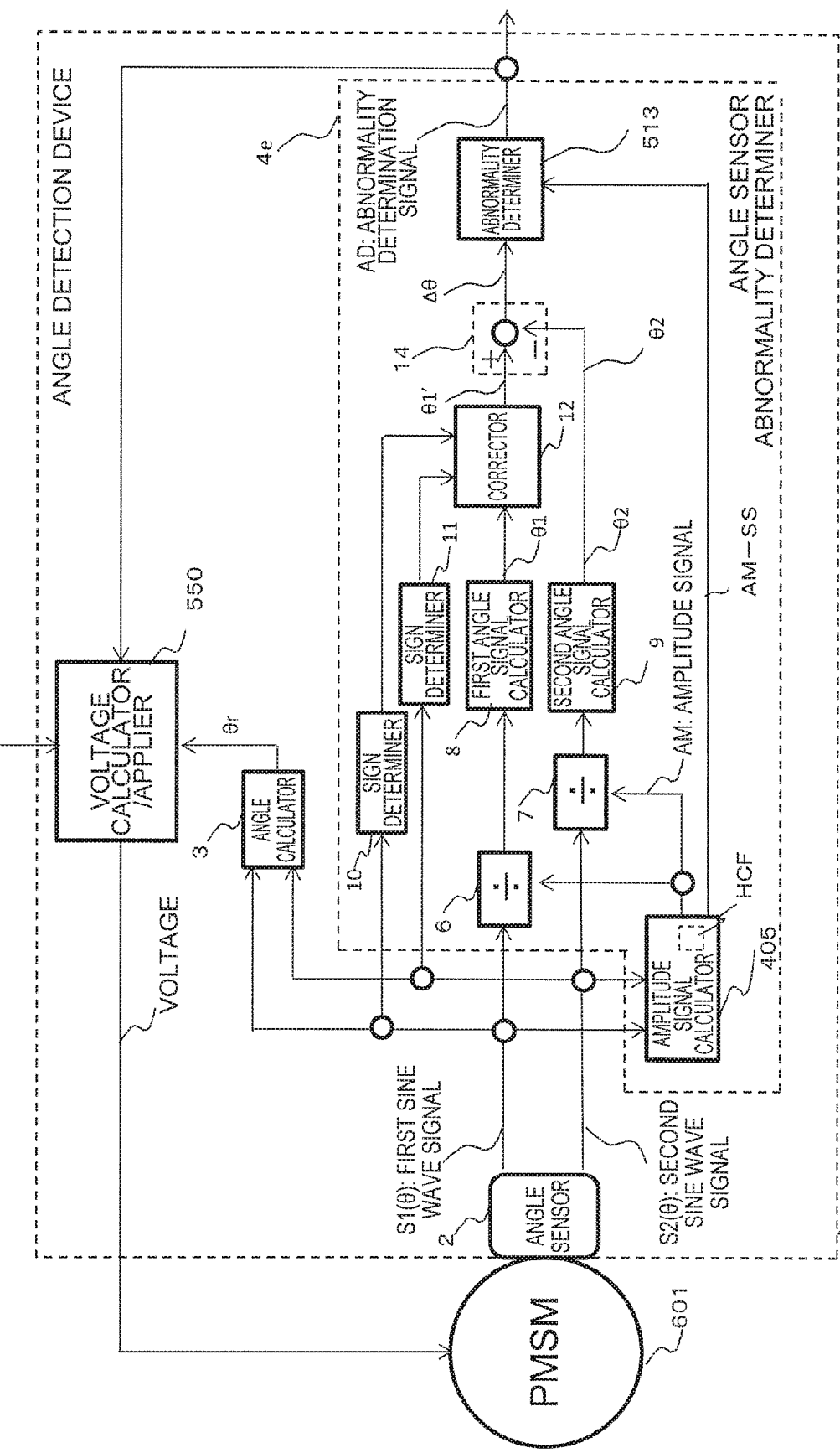
FIG. 15 is a diagram for illustrating an example of an overall configuration of an angle detection device according to a fifth embodiment of the present invention.

FIG. 15 is a diagram for illustrating an example of an overall configuration of an angle detection device according to a fifth embodiment of the present invention. The fifth embodiment differs from the fourth embodiment in, as illustrated in FIG. 15, a rotating machine 601 provided as the detection target 100, and a voltage calculator/applier 550 and an abnormality determiner 513 included in an angle sensor abnormality determiner 4e in an angle detection device 1e.

The rotating machine 601 is a permanent-magnet synchronous rotating machine (PMSM) having multi-phase terminals, and may be any one of an interior magnet type or a surface magnet type.

The voltage calculator/applier 550 calculates a voltage V for driving the rotating machine 601, and uses an AC output converter of a known technology, for example, an inverter or a matrix converter, to output the voltage to the multi-phase terminals of the rotating machine 601. As a method of calculating the voltage, a known technology is used. For example, the following current feedback control is performed, A current command of the rotating machine 601 is set as a control command CC, and the voltage V is calculated based on a deviation between the current command (not shown) on rotating two-axis coordinates (d-q coordinates) and a current (not shown) obtained by subjecting a current flowing through a multi-phase winding, which is detected by a current sensor or the like in the rotating machine 601, to coordinate conversion on the rotating two-axis coordinates (d-q coordinates) with use of the angle signal θr so that the deviation matches 0 through proportional-integral control.

Subsequently, the abnormality determiner 513 is described. The abnormality determiner 513 outputs the abnormality determination signal AD indicating the abnormality to the voltage calculator/applier 550 when the angle error Δθ between the first angle signal θ1 and the second angle signal θ2 exceeds a setting value set in advance, which is smaller than 90 degrees in electrical angle of the rotating machine 601.

Then, when the voltage calculator/applier 550 receives the abnormality determination signal AD indicating the abnormality from the abnormality determiner 513, the voltage calculator/applier 550 stops the application of the voltage V to the rotating machine 601 from the AC output converter in the voltage calculator/applier 550.

Now, the reason why the application of the voltage V is stopped when the angle error Δθ between the first angle signal θ1 and the second angle signal θ2 exceeds 90 degrees in electrical angle of the rotating machine 601 is described.

Figure 16:
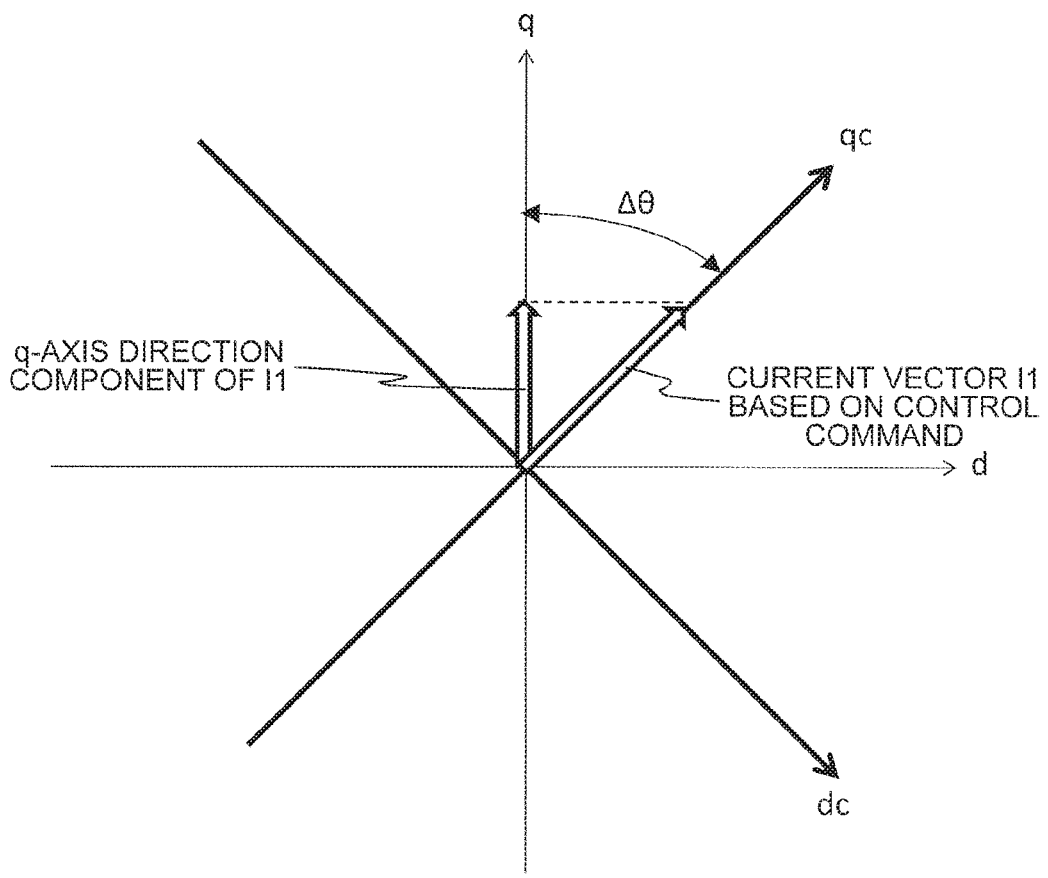
FIG. 16 is a graph for showing control of a permanent-magnet synchronous rotating machine corresponding to the angle detection device according to the fifth embodiment of the present invention.
Figure 17:
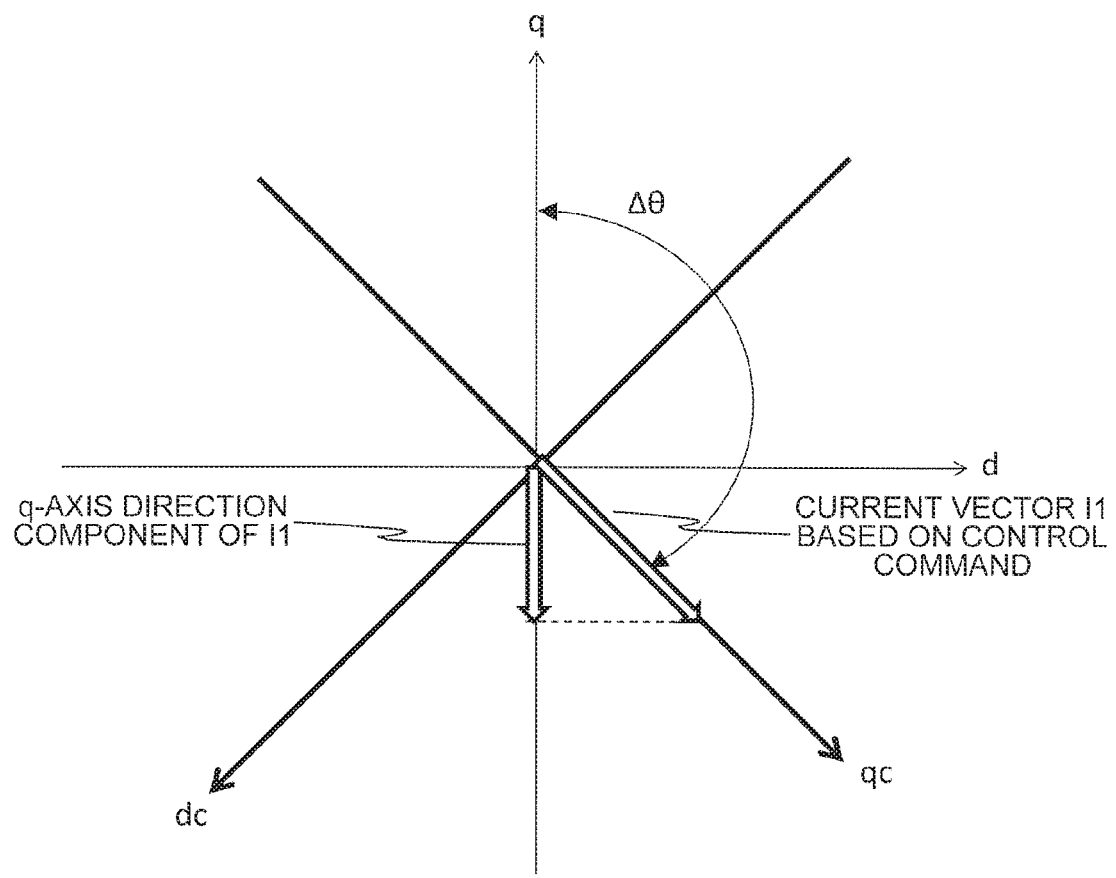
FIG. 17 is a graph for showing control of the permanent-magnet synchronous rotating machine corresponding to the angle detection device according to the fifth embodiment of the present invention.

The permanent-magnet synchronous rotating machine is generally controlled on the rotating two-axis coordinates (d-q coordinates), and hence this control is used also in the following description. FIG. 16 and FIG. 17 are graphs for showing the rotating two-axis coordinates for describing the control of the permanent-magnet synchronous rotating machine. In FIG. 16 and FIG. 17, the d-q-axis coordinates are coordinates of a true magnetic flux (d) axis and a torque (q) axis in the rotating machine 601. In contrast, when an angle error Δθ of less than 90 degrees is present, the rotating two-axis coordinates recognized by the voltage calculator/applier 550 is dc-qc-axis coordinates shown in FIG. 16 and FIG. 17.

In general, the permanent-magnet synchronous rotating machine is operated to accelerate or decelerate by supplying a q-axis current to the permanent-magnet synchronous rotating machine, and hence also in this example, a case in which a current is supplied on qc-axis coordinates is considered. In a permanent-magnet synchronous rotating machine using flux weakening control or reluctance torque, a d-axis current is also supplied, but this case is not considered here in order to simplify the description.

In this case, as shown in FIG. 16, the angle error Δθ is smaller than 90 degrees, and hence a q-axis direction component of a current vector I1, which is based on the control command and supplied in the positive sign direction on the qc-axis coordinates, is in the positive sign direction as in I1, and the torque or the speed and the position of the rotating machine 601 can be controlled in the same direction as that of the control command.

Meanwhile, FIG. 17 represents rotating two-axis coordinates of a case in which the angle error Δθ exceeds 90 degrees. In this case, although the current vector I1 based on the control command is supplied in the positive sign direction on the qc-axis coordinates, the current is supplied in the negative sign direction when observed on the q-axis coordinates. Thus, the rotating machine 601 is operated in a direction that is different from that of the control command to become uncontrollable.

Therefore, in the fifth embodiment, the abnormality determiner 513 determines that the angle sensor 2 is abnormal when the angle error Δθ between the first angle signal θ1 and the second angle signal θ2 exceeds a setting value set in advance, which is smaller than 90 degrees in electrical angle of the rotating machine 601, and outputs the abnormality determination signal AD indicating the abnormality. In this manner, the voltage calculator/applier 550, which has received the abnormality determination signal AD indicating the abnormality, stops the application of the voltage V to the rotating machine 601. Thus, the rotating machine 601 can be operated safely.

In actuality, the abnormality may be determined when the angle error Δθ exceeds 90 degrees in electrical angle of the rotating machine 601, but in the present invention, a margin is provided in consideration of safety, and the angle sensor 2 is determined to be abnormal when the angle error Δθ exceeds the setting value set in advance, which is smaller than 90 degrees in electrical angle of the rotating machine 601.

Sixth Embodiment

Figure 18:
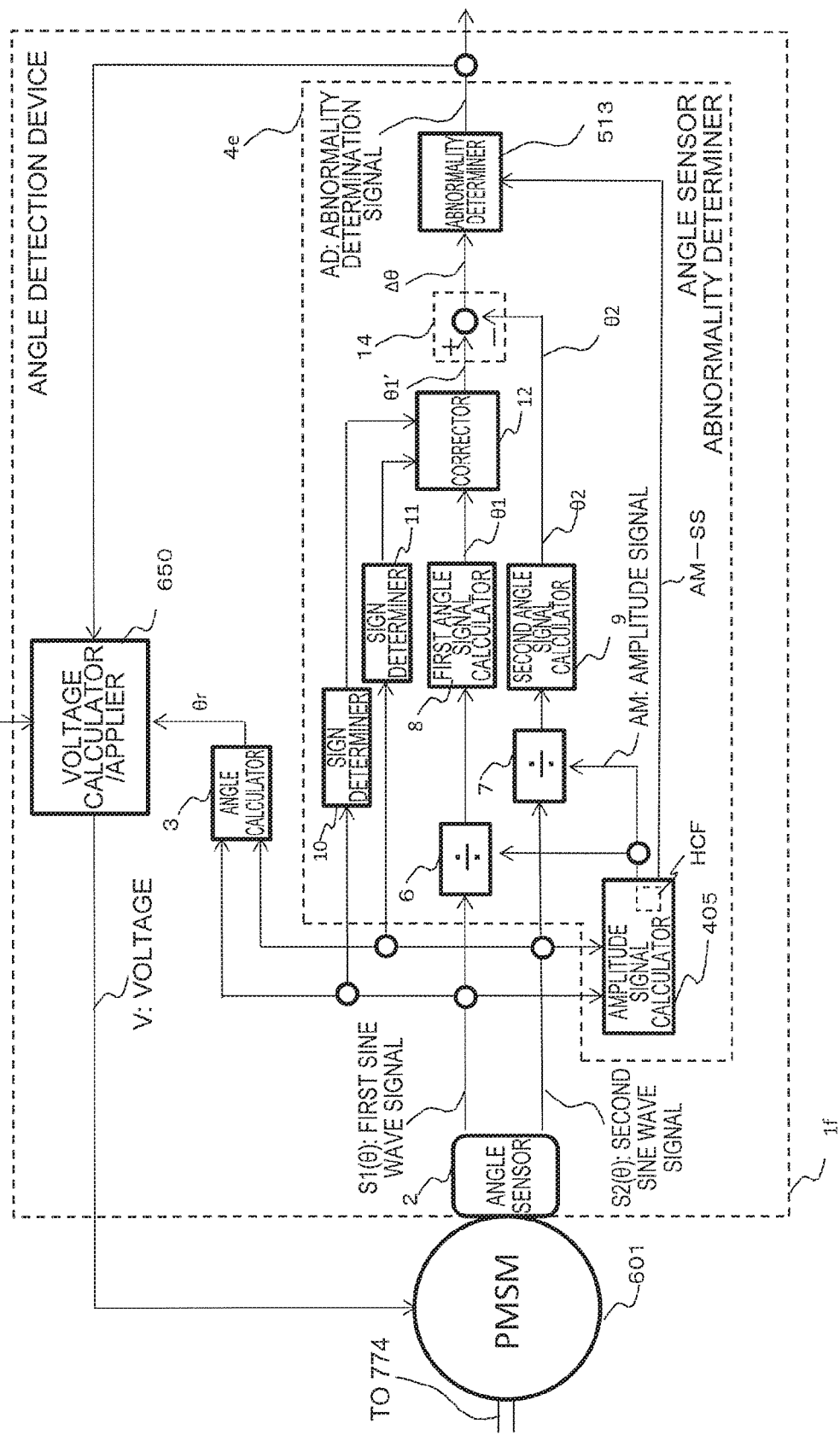
FIG. 18 is a diagram for illustrating an example of a configuration of an electric power steering control device according to a sixth embodiment of the present invention, which includes the angle detection device of any one of the embodiments of the present invention.
Figure 19:
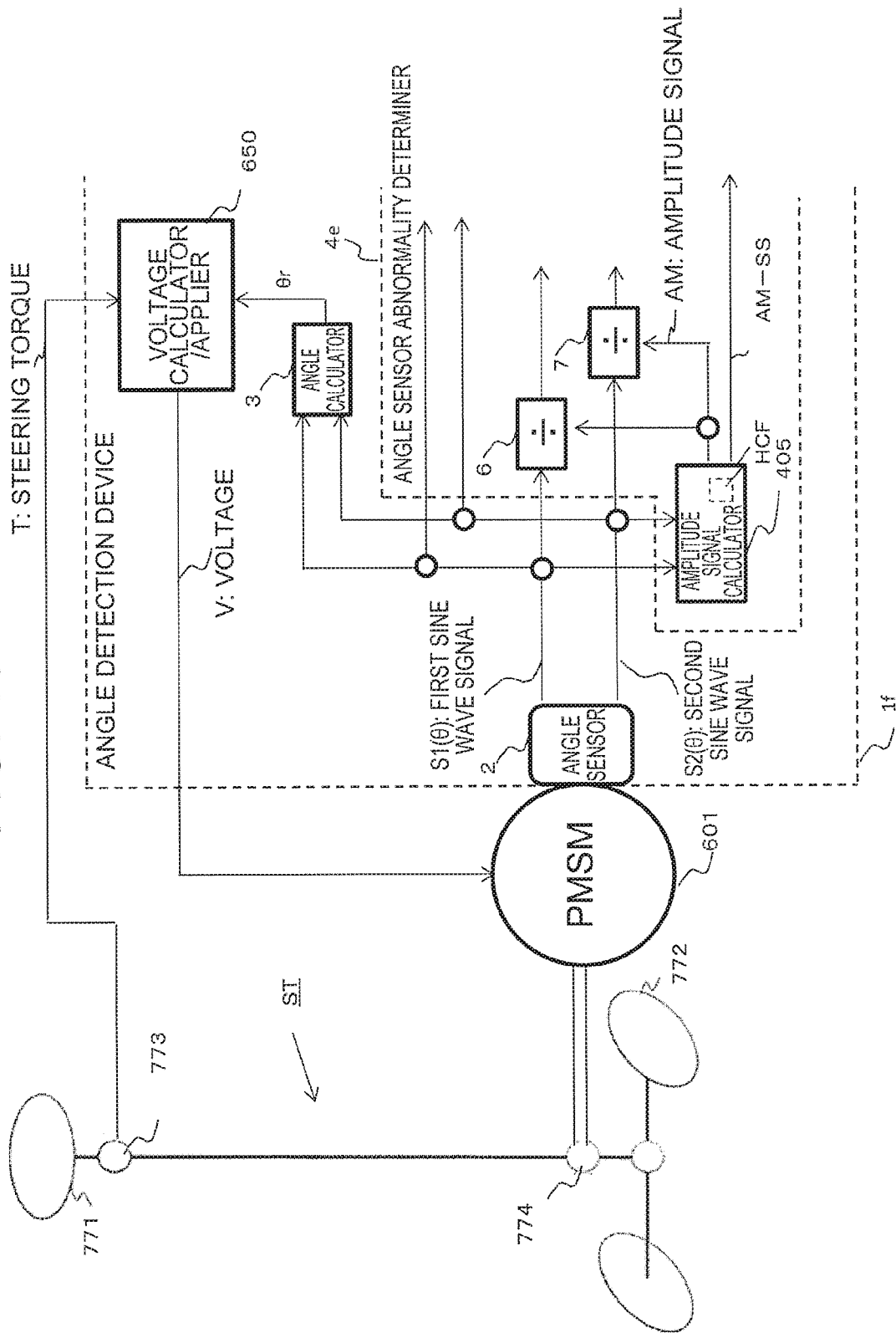
FIG. 19 is a diagram for illustrating an example of the configuration of the electric power steering control device according to the sixth embodiment of the present invention, which includes the angle detection device of any one of the embodiments of the present invention.

FIG. 18 and FIG. 19 are diagrams for illustrating an example of a configuration of an electric power steering control device according to a sixth embodiment of the present invention, which includes the angle detection device of any one of the above-mentioned embodiments. FIG. 18 is an illustration of the angle detection device part, and FIG. 19 is an illustration of a steering mechanism ST including a steering wheel to be connected to the left side of FIG. 18. The steering mechanism ST receives an assist torque for a steering torque from the rotating machine 601 controlled by the angle detection device of FIG. 18. In FIG. 18, the angle detection device according to the fifth embodiment illustrated in FIG. 15 is illustrated as an example of the angle detection device.

Next, the electric power steering control device according to the sixth embodiment of the present invention is described. In the fifth embodiment, the angle detection device 1e is described, but the electric power steering control device may be configured so that the torque for assisting the steering torque is generated by the rotating machine 601 controlled by the angle detection device.

In FIG. 19, a driver turns a steering wheel 771 to right or left to steer front wheels 772. A torque detector 773 detects the steering torque of the steering mechanism ST to output a steering torque T to a voltage calculator/applier 650. The voltage calculator/applier 650 replaces the control command CC in the voltage calculator/applier 550 described in the fifth embodiment with the steering torque T, and determines the current command of the rotating two-axis coordinates (d-q coordinates) based on the steering torque T of the torque detector 773 so that the rotating machine 601 generates the torque for assisting the steering torque T based on the steering torque T. Then, based on the deviation between the current command of the rotating two-axis coordinates (d-q coordinates) and the current obtained by subjecting the current flowing through the multi-phase winding, which is detected by the current sensor or the like in the rotating machine 601, to coordinate conversion on the rotating two-axis coordinates (d-q coordinates) with use of the angle signal θr, through such proportional-integral control that the deviation is caused to match 0, the voltage V to be applied to the rotating machine 601 is calculated and applied. The rotating machine 601 applied with the voltage V generates an assist torque for assisting the steering torque via a gear 774.

In such an electric power steering device, the sign of an assist torque current represented by the q-axis current changes depending on the direction of the steering torque T, which is the driver's steering direction. For example, when the sign of the assist torque current at the time when the driver performs steering by turning the steering wheel 771 to the left is positive, the sign of the assist torque current at the time when the driver performs steering by turning the steering wheel 771 to the right becomes negative.

In the electric power steering device, an assist that is definitely required to be avoided is a reverse assist. The reverse assist refers to an assist torque generated by the rotating machine 601 in a direction reverse to the driver's steering direction, which causes the front wheels 772 being steered wheels to be steered in a direction reverse to the driver's intention of steering the steering wheel.

In view of this, also in the electric power steering device according to the sixth embodiment, as described in the fifth embodiment, the abnormality determiner 513 outputs the abnormality determination signal AD indicating the abnormality when the angle error Δθ between the first angle signal θ1 and the second angle signal θ2 exceeds a setting value set in advance, which is smaller than 90 degrees. In this manner, the voltage calculator/applier 650, which has received the abnormality determination signal AD indicating the abnormality, stops application of the voltage V to the rotating machine 601. As a result, the electric power steering can be controlled safely with the reverse assist being avoided.

In the above-mentioned embodiments:
the divider 6 and the first angle signal calculator 8 construct a first angle signal calculation processor (6, 8);
the divider 7 and the second angle signal calculator 9 construct a second angle signal calculation processor (7, 9);
each of the subtracters 14 and 14*b* and each of the abnormality determiners (13, 413, and 513) construct an abnormality determination processor (13, 413, 513, 14, 14*b*); and
each of the sign determiners 10 and 11 and each of the correctors 12 and 212 construct a correction processor (10, 11, 12, 212).

Figure 20:
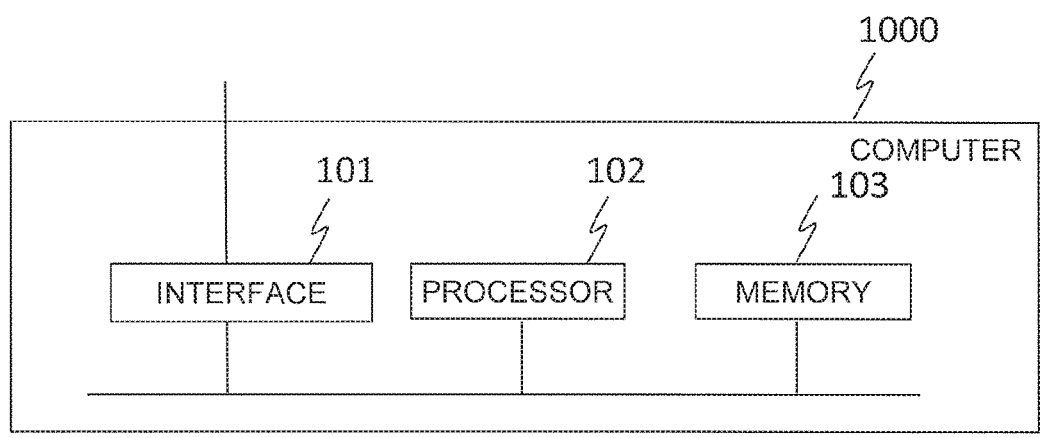
FIG. 20 is a schematic block diagram of a computer at the time when a calculation processor of the angle detection device according to the present invention is formed of the computer.

Further, calculation processing sections of each of the angle sensor abnormality determiners 4*a* to 4*e*, the angle calculator 3, and each of the voltage calculator/appliers 550 and 650 of the above-mentioned embodiments can be formed of one computer, for example. An example of a schematic configuration of the computer in this case is illustrated in FIG. 20.

In a computer 1000, input/output of the following signals is performed via an interface 101:
input signals such as:
the first sine wave signal S1(θ) and the second sine wave signal S2(θ) from the angle sensor 2;
the control command CC from the outside; and
the steering torque T from the torque detector 773; and
output signals such as:
the angle signal θr of the angle calculator 3; and
the abnormality determination signal AD to the outside or the voltage calculator/applier 650.

In a memory 103, programs of various functions for respective functional blocks illustrated and described as blocks in the description above and functional parts defined above, information required for processing, and data are to be stored or stored in advance. A processor 102 subjects the signal input via the interface 101 to calculation processing in accordance with the various programs, information, and data stored in the memory 103 to output the processing results via the interface 101.

Further, the above-mentioned various functions may be formed of one digital circuit, or may be formed of digital circuits for respective appropriate functions.

Further, the present invention is not limited to each of the above-mentioned embodiments, and the present invention includes all possible combinations of those embodiments.

INDUSTRIAL APPLICABILITY

The angle detection device according to the present invention is applicable to an angle detection device for a rotary member configured to rotate about one axis in various fields.

The invention claimed is:
1. An angle detection device, comprising:
an angle sensor to output a first sine wave signal and a second sine wave signal having phases that are different from each other by 90 degrees in accordance with rotation of a detection target;
an angle calculator to calculate an angle signal corresponding to a rotation angle of the detection target based on the first sine wave signal and the second sine wave signal; and
an angle sensor abnormality determiner determine an abnormality of the angle sensor based on the first sine wave signal and the second sine wave signal,
the angle sensor abnormality determiner including:
an amplitude signal calculator to calculate an amplitude signal based on a square root of a sum of squares, which is a value obtained by squaring and then adding the first sine wave signal and the second sine wave signal;
a first angle signal calculator to calculate a first angle signal by dividing the first sine wave signal by the amplitude signal;
a second angle signal calculator to calculate a second angle signal by dividing the second sine wave signal by the amplitude signal; and an abnormality determiner to determine the abnormality of the angle sensor based on an error between the first angle signal and the second angle signal.

2. The angle detection device according to claim 1, further comprising a corrector to correct the first angle signal or the second angle signal in accordance with a sign of the first sine wave signal and a sign of the second sine wave signal.

3. The angle detection device according to claim 2, wherein the corrector:
corrects the first angle signal to a value obtained by adding 180 degrees to a value obtained by inverting the sign of the first angle signal when the sign of the first sine wave signal is positive and the sign of the second sine wave signal is negative;
corrects the first angle signal to a value obtained by adding 180 degrees to a value of the first angle signal when the sign of the first sine wave signal is negative and the sign of the second sine wave signal is negative; and
corrects the first angle signal to a value obtained by inversing the sign of the first angle signal when the sign of the first sine wave signal is negative and the sign of the second sine wave signal is positive.

4. The angle detection device according to claim 2, wherein the corrector:
corrects the second angle signal to a value obtained by subtracting 180 degrees from a value obtained by inverting the sign of the second angle signal when the sign of the first sine wave signal is positive and the sign of the second sine wave signal is negative;
corrects the second angle signal to a value obtained by subtracting 180 degrees from a value of the second angle signal when the sign of the first sine wave signal is negative and the sign of the second sine wave signal is negative; and
corrects the second angle signal to a value obtained by inversing the sign of the second angle signal when the sign of the first sine wave signal is negative and the sign of the second sine wave signal is positive.

5. The angle detection device according to claim 1,
wherein the amplitude signal calculator sets, as the amplitude signal, a value obtained by causing the square root of the sum of the squares to pass through a high cut filter having a cutoff frequency set in advance, and
wherein the set cutoff frequency is higher than a variable frequency of an amplitude value of the first sine wave signal or the second sine wave signal due to heat generation.

6. The angle detection device according to claim 2,
wherein the amplitude signal calculator sets, as the amplitude signal, a value obtained by causing the square root of the sum of the squares to pass through a high cut filter having a cutoff frequency set in advance, and
wherein the set cutoff frequency is higher than a variable frequency of an amplitude value of the first sine wave signal or the second sine wave signal due to heat generation.

7. The angle detection device according to claim 3,
wherein the amplitude signal calculator sets, as the amplitude signal, a value obtained by causing the square root of the sum of the squares to pass through a high cut filter having a cutoff frequency set in advance, and
wherein the set cutoff frequency is higher than a variable frequency of an amplitude value of the first sine wave signal or the second sine wave signal due to heat generation.

8. The angle detection device according to claim 4,
wherein the amplitude signal calculator sets, as the amplitude signal, a value obtained by causing the square root of the sum of the squares to pass through a high cut filter having a cutoff frequency set in advance, and
wherein the set cutoff frequency is higher than a variable frequency of an amplitude value of the first sine wave signal or the second sine wave signal due to heat generation.

9. The angle detection device according to claim 5, wherein the abnormality determiner determines that the angle sensor is abnormal when a difference between the amplitude signal and the square root of the sum of the squares is equal to or larger than a setting value set in advance.

10. The angle detection device according to claim 6, wherein the abnormality determiner determines that the angle sensor is abnormal when a difference between the amplitude signal and the square root of the sum of the squares is equal to or larger than a setting value set in advance.

11. The angle detection device according to claim 7, wherein the abnormality determiner determines that the angle sensor is abnormal when a difference between the amplitude signal and the square root of the sum of the squares is equal to or larger than a setting value set in advance.

12. The angle detection device according to claim 8, wherein the abnormality determiner determines that the angle sensor is abnormal when a difference between the amplitude signal and the square root of the sum of the squares is equal to or larger than a setting value set in advance.

13. The angle detection device according to claim 1,
wherein the detection target includes a permanent-magnet synchronous rotating machine,
wherein the angle detection device further comprises a voltage calculate/applier to calculate a voltage to be applied to the detection target based on the angle signal,
wherein the voltage calculate/applier outputs the voltage to the detection target, and
wherein the abnormality determiner determines that the angle sensor is abnormal when a difference between the first angle signal and the second angle signal exceeds a setting value set in advance, which is smaller than 90 degrees in electrical angle of the detection target.

14. The angle detection device according to claim 2,
wherein the detection target includes a permanent-magnet synchronous rotating machine,
wherein the angle detection device further comprises a voltage calculate/applier to calculate a voltage to be applied to the detection target based on the angle signal,
wherein the voltage calculate/applier outputs the voltage to the detection target, and
wherein the abnormality determiner determines that the angle sensor is abnormal when a difference between the first angle signal and the second angle signal exceeds a setting value set in advance, which is smaller than 90 degrees in electrical angle of the detection target.

15. The angle detection device according to claim 3,
wherein the detection target includes a permanent-magnet synchronous rotating machine,
wherein the angle detection device further comprises a voltage calculate/applier to calculate a voltage to be applied to the detection target based on the angle signal,
wherein the voltage calculate/applier outputs the voltage to the detection target, and wherein the abnormality determiner determines that the angle sensor is abnormal when a difference between the first angle signal and the second angle signal exceeds a setting value set in advance, which is smaller than 90 degrees in electrical angle of the detection target.

16. The angle detection device according to claim 4,
wherein the detection target includes a permanent-magnet synchronous rotating machine,
wherein the angle detection device further comprises a voltage calculate/applier to calculate a voltage to be applied to the detection target based on the angle signal,
wherein the voltage calculate/applier outputs the voltage to the detection target, and
wherein the abnormality determiner determines that the angle sensor is abnormal when a difference between the first angle signal and the second angle signal exceeds a setting value set in advance, which is smaller than 90 degrees in electrical angle of the detection target.

17. The angle detection device according to claim 5,
wherein the detection target includes a permanent-magnet synchronous rotating machine,
wherein the angle detection device further comprises a voltage calculate/applier to calculate a voltage to be applied to the detection target based on the angle signal,
wherein the voltage calculate/applier outputs the voltage to the detection target, and
wherein the abnormality determiner determines that the angle sensor is abnormal when a difference between the first angle signal and the second angle signal exceeds a setting value set in advance, which is smaller than 90 degrees in electrical angle of the detection target.

18. The angle detection device according to claim 9,
wherein the detection target includes a permanent-magnet synchronous rotating machine,
wherein the angle detection device further comprises a voltage calculate/applier to calculate a voltage to be applied to the detection target based on the angle signal,
wherein the voltage calculate/applier outputs the voltage to the detection target, and
wherein the abnormality determiner determines that the angle sensor is abnormal when a difference between the first angle signal and the second angle signal exceeds a setting value set in advance, which is smaller than 90 degrees in electrical angle of the detection target.

19. An electric power steering control device, comprising:
the angle detection device of claim 13;
the permanent-magnet synchronous rotating machine, which is the detection target of the angle detection device; and
a steering mechanism to receive a torque for assisting a steering torque from the permanent-magnet synchronous rotating machine,
wherein the steering mechanism includes a torque detector to detect the steering torque of the steering mechanism,
wherein the voltage calculate/applier of the angle detection device calculates and applies a voltage to be applied to the permanent-magnet synchronous rotating machine based on the steering torque of the torque detector, and
wherein, when the abnormality determiner of the angle detection device determines that the angle sensor is abnormal, the voltage calculate/applier stops output of the voltage to the permanent-magnet synchronous rotating machine.

* * * * *